United States Patent [19]
Muthusamy

[11] Patent Number: 6,108,774
[45] Date of Patent: *Aug. 22, 2000

[54] BRANCH PREDICTION WITH ADDED SELECTOR BITS TO INCREASE BRANCH PREDICTION CAPACITY AND FLEXIBILITY WITH MINIMAL ADDED BITS

[75] Inventor: Karthikeyan Muthusamy, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/994,869

[22] Filed: Dec. 19, 1997

[51] Int. Cl.$^7$ ...................................................... G06F 9/38
[52] U.S. Cl. ............................................................ 712/240
[58] Field of Search .................................. 712/240, 238, 712/239

[56] References Cited

U.S. PATENT DOCUMENTS

| | | | |
|---|---|---|---|
| 4,179,737 | 12/1979 | Kim | 712/241 |
| 4,860,197 | 8/1989 | Langendorf et al. | 712/238 |
| 5,142,634 | 8/1992 | Fite et al. | 712/240 |
| 5,235,697 | 8/1993 | Steely, Jr. et al. | 711/137 |
| 5,381,533 | 1/1995 | Peleg et al. | 712/215 |
| 5,418,922 | 5/1995 | Liu | 711/3 |
| 5,454,117 | 9/1995 | Puziol et al. | 712/23 |
| 5,553,254 | 9/1996 | Berstis et al. | 712/207 |
| 5,574,871 | 11/1996 | Hoyt et al. | 395/376 |
| 5,592,634 | 1/1997 | Circello et al. | 712/239 |
| 5,623,614 | 4/1997 | Van Dyke et al. | 395/587 |
| 5,649,137 | 7/1997 | Favor et al. | 712/207 |
| 5,649,178 | 7/1997 | Blaner et al. | 712/240 |
| 5,708,803 | 1/1998 | Ishimi et al. | 712/233 |
| 5,737,590 | 4/1998 | Hara | 712/238 |
| 5,758,142 | 5/1998 | McFarling et al. | 712/239 |
| 5,764,946 | 6/1998 | Tran et al. | 712/239 |
| 5,794,028 | 8/1998 | Tran | 395/587 |
| 5,799,162 | 8/1998 | Christie et al. | 395/381 |
| 5,822,575 | 10/1998 | Tran | 395/586 |
| 5,954,816 | 9/1999 | Tran et al. | 712/239 |

FOREIGN PATENT DOCUMENTS

| | | |
|---|---|---|
| 0 199 947 | 11/1986 | European Pat. Off. . |
| 0 394 711 | 10/1990 | European Pat. Off. . |
| 0 586 057 | 3/1994 | European Pat. Off. . |
| 0 605 876 | 7/1994 | European Pat. Off. . |
| 0649084A1 | 4/1995 | European Pat. Off. . |
| 2 285 526 | 7/1995 | United Kingdom . |
| 93/17385 | 9/1993 | WIPO . |

OTHER PUBLICATIONS

Calder et al., "Next Cache Line and Set Prediction," Computer Architecture News, vol. 23, No. 2, May 1995, pp. 287–296.

Young et al., "An Intelligent I–Cache Prefetch Mechanism," IEEE, Mar. 10, 1993, pp. 44–49.

International Search Report for PCT/US98/11987 dated Nov. 5, 1998.

*Primary Examiner*—Meng-Ai T. An
*Assistant Examiner*—Gautam R. Patel
*Attorney, Agent, or Firm*—Conley, Rose & Tayon, PC; B. Noel Kivlin

[57] ABSTRACT

A branch prediction unit stores as set of branch selectors corresponding to each of a group of contiguous instruction bytes stored in an instruction cache. Each branch selector identifies a branch prediction to be selected if a fetch address corresponding to that branch selector is presented. The branch prediction unit additionally stores a set of return selectors corresponding to one or more branch predictions. The return selectors identify the type of branch selection. For example, the branch predictions may include a sequential branch prediction and a branch instruction branch prediction. The return selectors may identify whether the branch instruction branch prediction is associated with the return instruction or a non-return branch instruction.

22 Claims, 15 Drawing Sheets

| Byte Position | 0 | 1 | 2-3 | 4-5 | 6-7 | 8-9 | A-B | C-D | E-F |
|---|---|---|---|---|---|---|---|---|---|
| Branch Selector Position | 0 | 1 | 2 | 3 | 4 | 5 | 6 | 7 | 8 |
| Read Addresses | 0000 | 0001 | 001x | 010x | 011x | 100x | 101x | 110x | 111x |
| Encoding Addresses | 0000 | 0001 0010 | 0011 0100 | 0101 0110 | 0111 1000 | 1001 1010 | 1011 1100 | 1101 1110 | 1111 |

| Byte Position | E | F | 0 | 1 |
|---|---|---|---|---|
| Instruction | IN0 | PB0 | | IN1 |
| Branch Selector | 0 | 0 | 3 | 2 |

| Byte Position | 2 | 3 | 4 | 5 |
|---|---|---|---|---|
| Instruction | IN0 | PB0 | | RET |
| Branch Selector | 3 | 3 | 1 | 1 |

| Byte Position | 2 | 3 | 4 | 5 |
|---|---|---|---|---|
| Instruction | PB0 | | RET | IN1 |
| Branch Selector | 3 | | 0 | |

| Byte Position | 3 | 4 | 5 | 6 | 7 | 8 |
|---|---|---|---|---|---|---|
| Instruction | IN0 | RET | PB0 | | | IN1 |
| Branch Selector | 1 | 3 | | 0 | | 0 |

Branch and ReturnSelector Encoding

| Branch Selector | Return Selector | Branch Prediction |
| --- | --- | --- |
| 00 | XXX | Sequential |
| 01 | XX1 | Return 1 |
| 01 | XX0 | Branch Prediction 1 |
| 10 | X1X | Return 2 |
| 10 | X0X | Branch Prediction 2 |
| 11 | 1XX | Return 3 |
| 11 | 0XX | Branch Prediction 3 |

BRANCH PREDICTION WITH ADDED SELECTOR BITS TO INCREASE BRANCH PREDICTION CAPACITY AND FLEXIBILITY WITH MINIMAL ADDED BITS

BACKGROUND OF THE INVENTION

1. Field of the Invention

This invention relates to the field of microprocessors and, more particularly, to branch prediction mechanisms within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of a superscalar microprocessor (and a superpipelined microprocessor as well) is its branch prediction mechanism. The branch prediction mechanism indicates a predicted direction (taken or not-taken) for a branch instruction, allowing subsequent instruction fetching to continue within the predicted instruction stream indicated by the branch prediction. A branch instruction is an instruction which causes subsequent instructions to be fetched from one of at least two addresses: a sequential address identifying an instruction stream beginning with instructions which directly follow the branch instruction; and a target address identifying an instruction stream beginning at an arbitrary location in memory. Unconditional branch instructions always branch to the target address, while conditional branch instructions may select either the sequential or the target address based on the outcome of a prior instruction. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

In order to be effective, the branch prediction mechanism must be highly accurate such that the predicted instruction stream is correct as often as possible. Typically, increasing the accuracy of the branch prediction mechanism is achieved by increasing the complexity of the branch prediction mechanism. For example, a cache-line based branch prediction scheme may be employed in which branch predictions are stored with a particular cache line of instruction bytes in an instruction cache. A cache line is a number of contiguous bytes which are treated as a unit for allocation and deallocation of storage space within the instruction cache. When the cache line is fetched, the corresponding branch predictions are also fetched. Furthermore, when the particular cache line is discarded, the corresponding branch predictions are discarded as well. The cache line is aligned in memory. A cache-line based branch prediction scheme may be made more accurate by storing a larger number of branch predictions for each cache line. A given cache line may include multiple branch instructions, each of which is represented by a different branch prediction. Therefore, more branch predictions allocated to a cache line allows for more branch instructions to be represented and predicted by the branch prediction mechanism. A branch instruction which cannot be represented within the branch prediction mechanism is not predicted, and subsequently a "misprediction" may be detected if the branch is found to be taken. However, complexity of the branch prediction mechanism is increased by the need to select between additional branch predictions. As used herein, a "branch prediction" is a value which may be interpreted by the branch prediction mechanism as a prediction of whether or not a branch instruction is taken or not taken. Furthermore, a branch prediction may include the target address. For cache-line based branch prediction mechanisms, a prediction of a sequential line to the cache line being fetched is a branch prediction when no branch instructions are within the instructions being fetched from the cache line.

A problem related to the branch prediction mechanism is that multiple types of branch instructions may be encountered. These types of branch instructions may require different branch predictions and different target addresses. For example, a return instruction may always be predicted taken and the target address retrieved from a return address stack. In contrast, a conditional branch instruction may be predicted taken or not taken and the target address may be taken from a target address array. To accommodate the different types of instructions, the branch predictions for each cache line are allocated among the different types of branch instructions. For example, one branch prediction may be assigned to a sequential line, one branch prediction may be assigned to a return instruction and two branch predictions may be assigned to non-return branch instructions. Unfortunately, the above scheme does not accommodate cache lines with two return instructions or three non-return branch instructions.

SUMMARY OF THE INVENTION

The problems outlined above are in large part solved by a branch prediction apparatus and method in accordance with the present invention. The branch prediction apparatus stores one or more return selector bits which identify whether a particular branch prediction is associated with a return instruction or a non-return branch instruction. In this manner, each branch prediction may accommodate either return instructions or non-return branch instructions. Accordingly, more combinations of return and branch instructions may be accommodated with minimal additional storage space and circuitry.

Broadly speaking, the present invention contemplates a branch prediction apparatus including a branch prediction storage and a selection mechanism. The branch prediction storage is coupled to receive a fetch address corresponding to a group of contiguous instruction bytes being fetched from an instruction cache. The branch prediction storage is configured to store a plurality of branch selectors and a return selector. At least one of the plurality of branch selectors corresponds to a first instruction within the group of contiguous instruction bytes and the return selector corresponds to at least one of the branch selectors. The one of the plurality of branch selectors and the return selector identify a particular branch prediction to be selected if the first instruction is fetched. The selection mechanism is coupled to the branch prediction storage to receive the plurality of branch selectors and the return selector. The selection mechanism is configured to select a particular one of the plurality of branch selectors in response to a plurality of least significant bits of a fetch address used to fetch the group of contiguous instruction bytes and to select the particular branch prediction in response to the particular branch selector and the return selector.

The present invention further contemplates a method for selecting a branch prediction corresponding to a group of contiguous instruction bytes including a plurality of instructions including: storing a plurality of branch selectors in a branch prediction storage, wherein at least one of the plurality of branch selectors corresponds to a first one of the plurality of instructions; storing a return selector in the branch prediction storage, wherein the return selector corresponds to at least one of the plurality of the branch selectors and wherein at least one of the plurality of branch selectors and the return selector identify a particular branch prediction to be selected if the first one of the plurality of instructions is fetched; fetching the group of contiguous instruction bytes and concurrently fetching the plurality of branch selectors and the return selector using a fetch address identifying the group of contiguous instruction bytes; selecting one of the plurality of branch selectors in response to the fetch address; and selecting the branch prediction in response to the one of the plurality of the branch selectors and the return selector.

The present invention still further contemplates a microprocessor including an instruction cache and a branch prediction unit. The instruction cache is configured to store a plurality of cache lines of instruction bytes and to provide a group of instruction bytes upon receipt of a fetch address to an instruction processing pipeline of the microprocessor. The branch prediction unit is coupled to the instruction cache and coupled to receive the fetch address concurrent with the instruction cache. The branch prediction unit is configured to store a plurality of branch selectors and a return selector with respect to the group of instruction bytes and is configured to select one of the plurality of branch selectors in response to the fetch address. The one of the plurality of branch selectors and the return selector identifies a branch prediction which is used as a subsequent fetch address by the instruction cache.

BRIEF DESCRIPTION OF THE DRAWINGS

Other objects and advantages of the invention will become apparent upon reading the following detailed description and upon reference to the accompanying drawings in which:

FIG. 5 is a table illustrating one embodiment of byte ranges within a set of contiguous instruction bytes.

FIG. 8 is a third example of branch selectors for a third exemplary set of instructions.

FIG. 9 is a fourth example of branch selectors for a fourth exemplary set of instructions.

Figure 1:
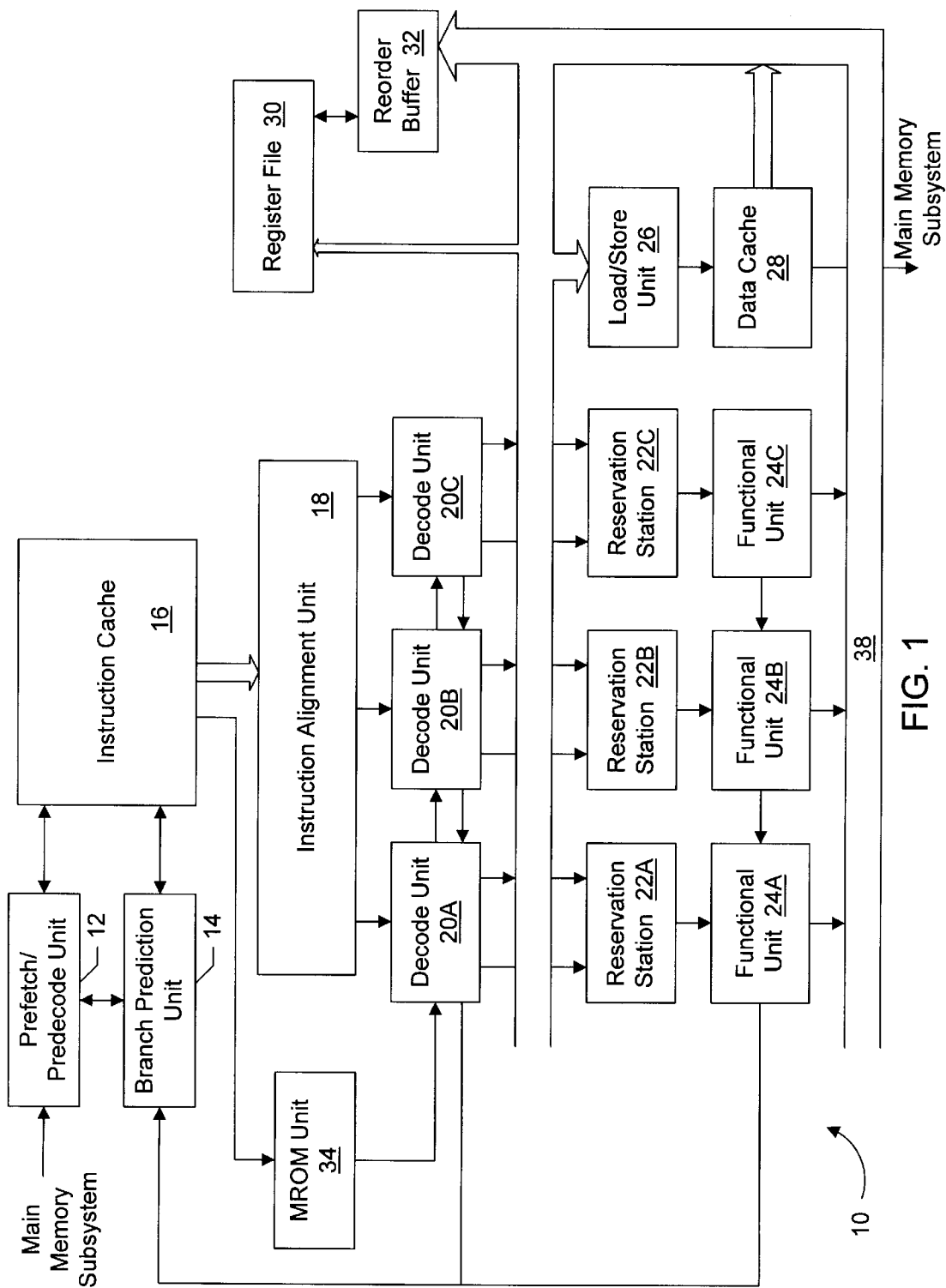
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24.

Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MOM unit 34 is coupled to decode units 20.

Generally speaking, branch prediction unit 14 employs a cache-line based branch prediction mechanism for predicting branch instructions. Multiple branch predictions may be stored for each cache line. Additionally, a branch selector is stored for each byte within the cache line. The branch selector for a particular byte indicates which of the branch predictions which may be stored with respect to the cache line is the branch prediction appropriate for an instruction fetch address which fetches the particular byte. Additionally, one or more return selector bits may be stored for each branch selector. The return selector bits indicate whether a branch selector is associated with a return instruction branch prediction or a non-return instruction branch prediction. The appropriate branch prediction is the branch prediction for the first predicted-taken branch instruction encountered within the cache line subsequent to the particular byte. As used herein, the terms "subsequent" and "prior to" refer to an ordering of bytes within the cache line. A byte stored at a memory address which is numerically smaller than the memory address at which a second byte is stored is prior to the second byte. Conversely, a byte stored at a memory address which is numerically larger than the memory address of a second byte is subsequent to the second byte. Similarly, a first instruction is prior to a second instruction in program order if the first instruction is encountered before the second instruction when stepping one at a time through the sequence of instructions forming the program.

In one embodiment, microprocessor 10 employs a microprocessor architecture in which the instruction set is a variable byte length instruction set (e.g. the x86 microprocessor architecture). When a variable byte length instruction set is employed, any byte within the cache line may be identified as the first byte to be fetched by a given fetch address. For example, a branch instruction may have a target address at byte position two within a cache line. In such a case, the bytes at byte positions zero and one are not being fetched during the current cache access. Additionally, bytes subsequent to a predicted-taken branch which is subsequent to the first byte are not fetched during the current cache access. Since branch selectors are stored for each byte, the branch prediction for the predicted taken branch can be located by selecting the branch selector of the first byte to be fetched from the cache line. The branch selector is used to select the appropriate branch prediction, which is then provided to the instruction fetch logic in instruction cache 16. During the succeeding clock cycle, the branch prediction is used as the fetch address. Advantageously, the process of comparing the byte position of the first byte being fetched to the byte positions of the predicted-taken branch instructions is eliminated from the generation of a branch prediction in response to a fetch address. The amount of time required to form a branch prediction may be reduced accordingly, allowing the branch prediction mechanism to operate at higher clock frequencies (i.e. shorter clock cycles) while still providing a single cycle branch prediction.

It is noted that, although the term "cache line" has been used in the preceding discussion, some embodiments of instruction cache 16 may not provide an entire cache line at its output during a given clock cycle. For example, in one embodiment instruction cache 16 is configured with 32 byte cache lines. However, only 16 bytes are fetched in a given clock cycle (either the upper half or the lower half of the cache line). The branch prediction storage locations and branch selectors are allocated to the portion of the cache line being fetched. As used herein, the term "group of contiguous instruction bytes" is used to refer to the instruction bytes which are provided by the instruction cache in a particular clock cycle in response to a fetch address. A group of contiguous instruction bytes may be a portion of a cache line or an entire cache line, according to various embodiments. When a group of contiguous instruction bytes is a portion of a cache line, it is still an aligned portion of a cache line. For example, if a group of contiguous instruction bytes is half a cache line, it is either the upper half of the cache line or the lower half of the cache line. A number of branch prediction storage locations are allocated to each group of contiguous instruction bytes, and branch selectors indicate one of the branch prediction storage locations associated with that group. Furthermore, branch selectors may indicate a return stack address from a return stack structure or a sequential address if no branch instructions are encountered between the corresponding byte and the last byte in the group of contiguous instruction bytes.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to three branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores three targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
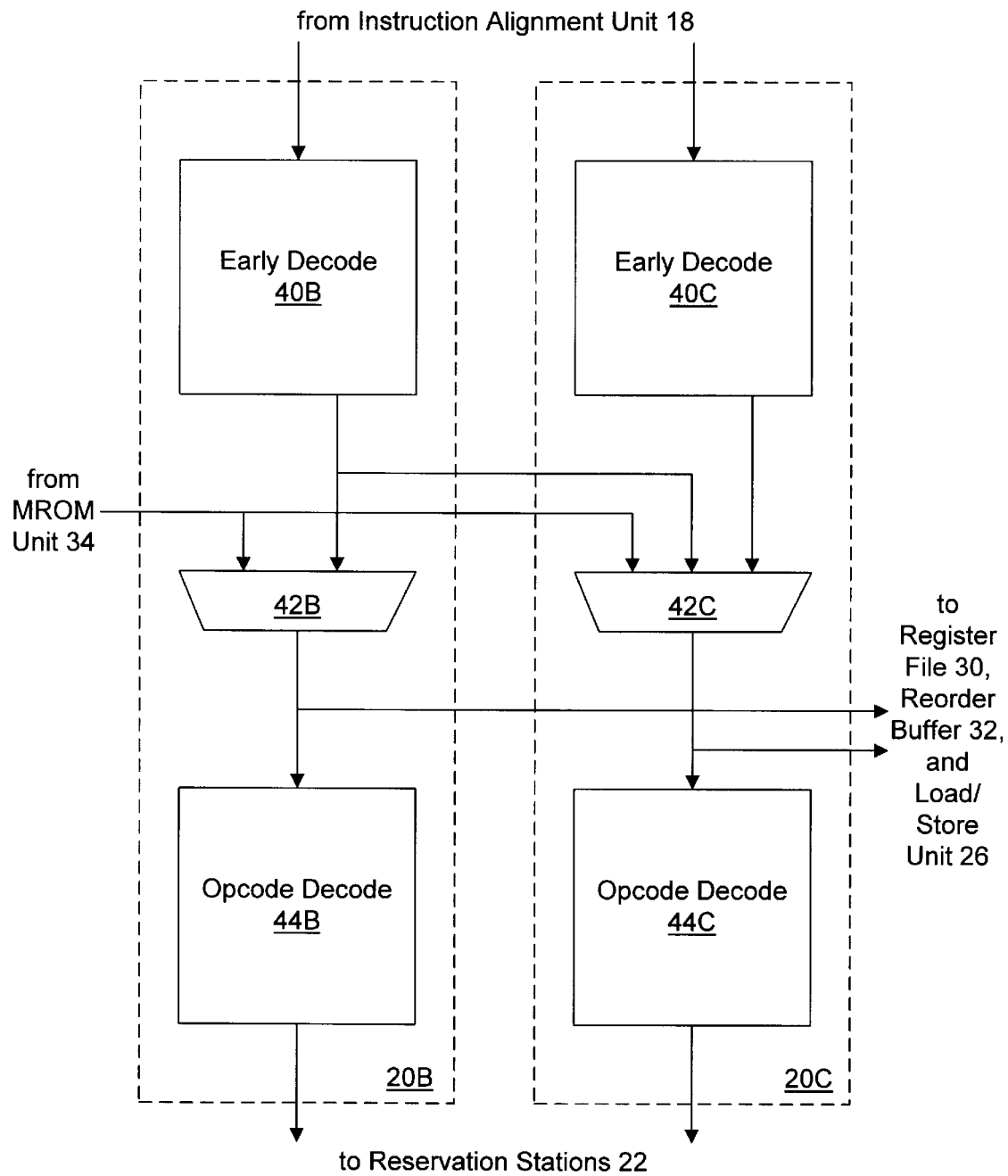
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
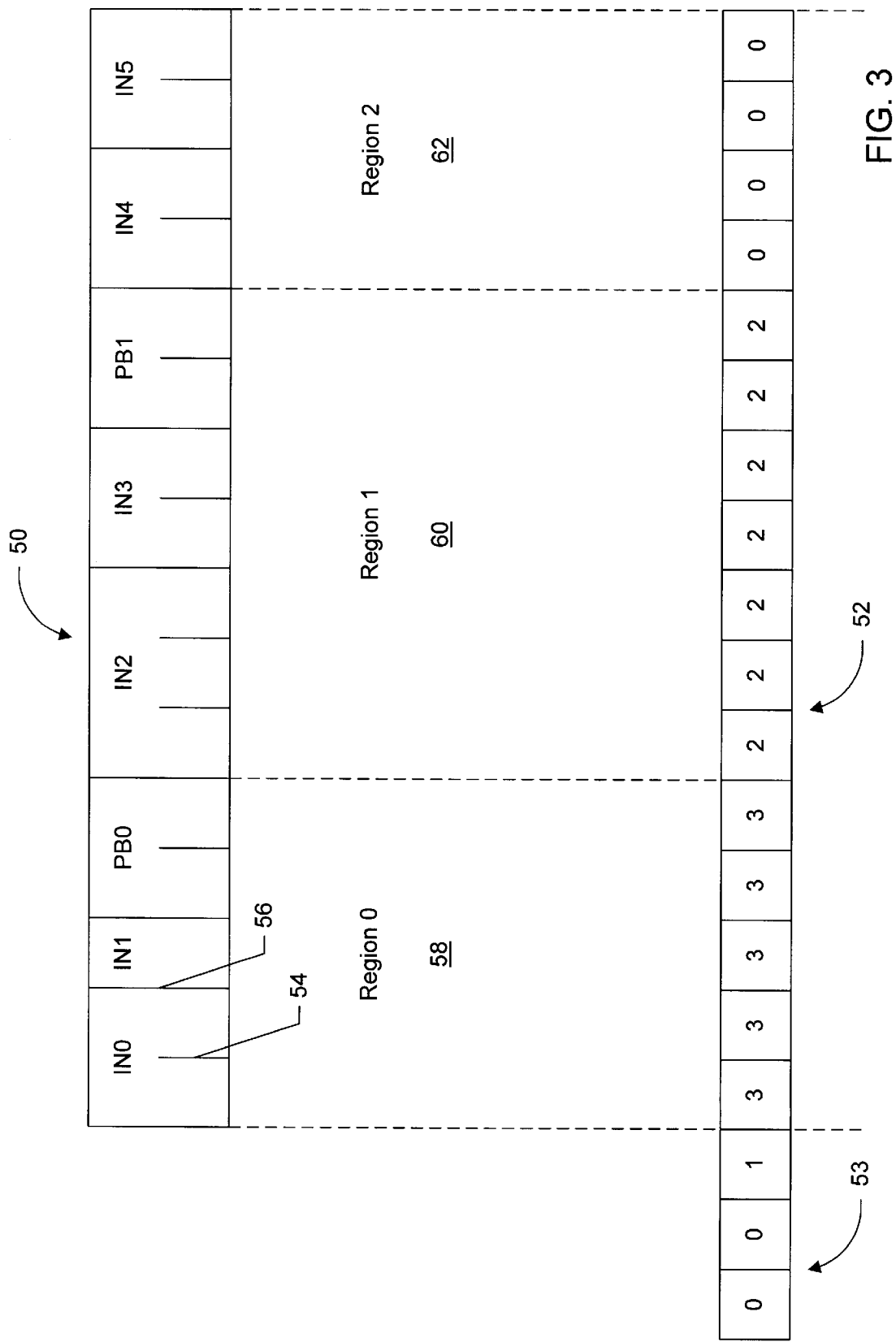
FIG. 3 is a diagram of a group of contiguous instruction bytes and corresponding sets of branch selectors and return selectors.

Turning now to FIG. 3, a diagram of an exemplary group of contiguous instruction bytes 50 and a corresponding set of branch selectors 52 and return selectors 53 are shown. In FIG. 3, each byte within an instruction is illustrated by a short vertical line (e.g. reference number 54). Additionally, the vertical lines separating instructions in group 50 delimit bytes (e.g. reference number 56). The instructions shown in FIG. 3 are variable in length, and therefore the instruction set including the instructions shown in. FIG. 3 is a variable byte length instruction set. In other words, a first instruction within the variable byte length instruction set may occupy a first number of bytes which is different than a second number of bytes occupied by a second instruction within the instruction set. Other instruction sets may be fixed-length, such that each instruction within the instruction set occupies the same number of bytes as each other instruction.

As illustrated in FIG. 3, group 50 includes non-branch instructions IN0–IN5. Instructions IN0, IN3, IN4, and IN5 are two byte instructions. Instruction IN1 is a one byte instruction and instruction IN2 is a three byte instruction. Two predicted-taken branch instructions PB0 and PB1 are illustrated as well, each shown as occupying two bytes. It is noted that both non-branch and branch instructions may occupy various numbers of bytes.

The end byte of each predicted-taken branch PB0 and PB1 provides a division of group 50 into three regions: a first region 58, a second region 60, and a third region 62. If a fetch address identifying group 50 is presented, and the offset of the fetch address within the group identifies a byte position within first region 58, then the first predicted-taken branch instruction to be encountered is PB0 and therefore the branch prediction for PB0 is selected by the branch prediction mechanism. Similarly, if the offset of the fetch address identifies a byte within second region 60, the appropriate branch prediction is the branch prediction for PB1. Finally, if the offset of the fetch address identifies a byte within third region 62, then there is no predicted-taken branch instruction within the group of instruction bytes and subsequent to the identified byte. Therefore, the branch prediction for third region 62 is sequential. The sequential address identifies the group of instruction bytes which immediately follows group 50 within main memory.

As used herein, the offset of an address comprises a number of least significant bits of the address. The number is sufficient to provide different encodings of the bits for each byte within the group of bytes to which the offset relates. For example, group 50 is 16 bytes. Therefore, four least significant bits of an address within the group form the offset of the address. The remaining bits of the address identify group 50 from other groups of instruction bytes within the main memory. Additionally, a number of least significant bits of the remaining bits form an index used by instruction cache 16 to select a row of storage locations which are eligible for storing group 50.

Set 52 is an exemplary set of branch selectors for group 50. One branch selector is included for each byte within group 50. The branch selectors within set 52 use the encoding shown in FIG. 13 below. In the example, the branch prediction for PB0 is stored as the third of three branch predictions associated with group 50 (as indicated by a branch selector value of "3"). Therefore, the branch selector for each byte within first region 58 is set to "3". Similarly, the branch prediction for PB1 is stored as the second of the branch predictions (as indicated by a branch selector value of "2"). Therefore, the branch selector for each byte within second region 60 is set to "2". Finally, the sequential branch prediction is indicated by the branch selectors for bytes within third region 62 by a branch selector encoding of "0".

It is noted that, due to the variable byte length nature of the x86 instruction set, a branch instruction may begin within one group of contiguous instruction bytes and end within a second group of contiguous instruction bytes. In such a case, the branch prediction for the branch instruction is stored with the second group of contiguous instruction bytes. Among other things, the bytes of the branch instruction which are stored within the second group of contiguous instruction bytes need to be fetched and dispatched. Forming the branch prediction in the first group of contiguous instruction bytes would cause the bytes of the branch instruction which lie within the second group of instruction bytes not to be fetched.

Set 53 is an exemplary set of return selectors for group 50. The return selectors within group 53 use the encoding shown in FIG. 13 below. In the example, the return selectors indicate whether a branch selector identifies a return instruction or a non-return branch instruction. In the illustrated embodiment, one return selector bit is associated with each non-sequential branch selector (i.e., branch selector values "1", "2" and "3"). The return selector value identifies whether the branch selector associated with the return selector corresponds to a return instruction or a non-return branch instruction. In the illustrated embodiment, if the return selector value is "1", the associated branch selector identifies a return instruction. Alternatively, if the return selector value is "0", the associated branch selector identifies a non-branch return instruction. In the illustrated embodiment, set 53 indicates that the first branch selector identifies a return instruction and the second and third branch selectors identify non-return branch instructions. In the illustrated embodiment, group 50 includes two non-return branch instructions and no return instructions. If a return instruction was included in set 50, the branch selector for each byte within the region delineated by the return instruction would be set to "1". Alternatively, if group 50 included a third non-return branch instruction, the first bit of set 53 may be deasserted (i.e., set to "0") and the branch selector for each byte within the region delineated by the third non-return branch instruction is set to "1".

The return selectors permit the branch selectors to be more efficiently allocated among the possible branch predictions. For example, in embodiments without return selectors, a two-bit branch selector may identify one sequential prediction, one return instruction branch prediction or two non-return branch instruction predictions. In this embodiment, the branch selectors are not able to accommodate cache lines with two or more return instructions or three or more non-return branch instructions. If a cache line exceeds the number of return instructions or non-return branch instructions, one or more branch instructions within the cache line may not be predicted. The return selectors permit each branch selector to be allocated among multiple types of branch instructions. For example, the return selectors may indicate whether a branch selector is associated with a return instruction branch prediction or non-return instruction branch prediction. In this manner, the non-sequential branch predictions may be allocated according to the type of branch instructions in a cache line. For example, three branch selectors may be allocated as return instruction predictions or three branch selectors may be allocated as non-return instruction branch predictions.

Figure 4:
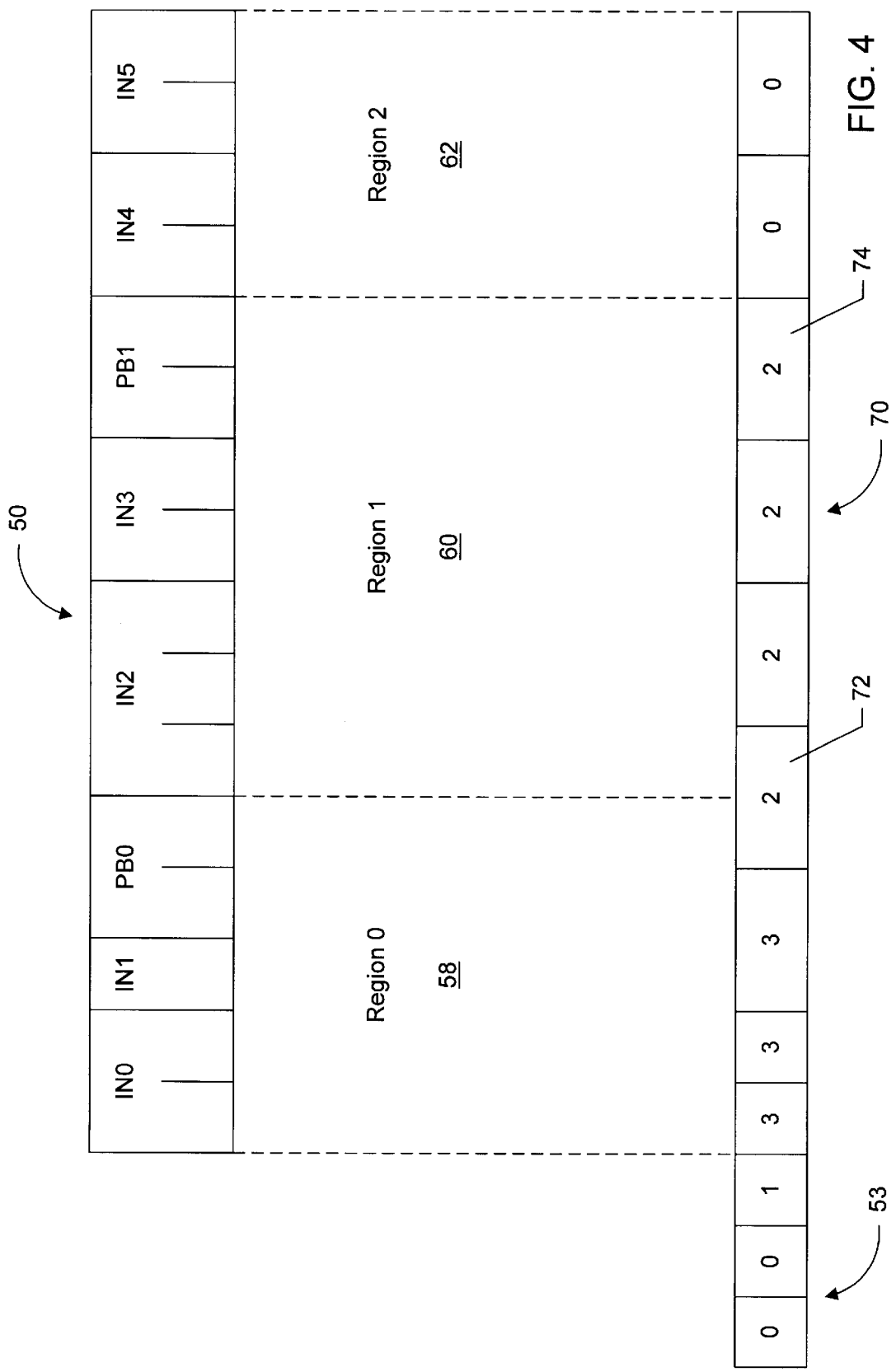
FIG. 4 is a block diagram of a group of contiguous instruction bytes and corresponding sets of branch selectors and return selectors according to one embodiment of the branch prediction mechanism for the microprocessor shown in FIG. 1.

Turning next to FIG. 4, a diagram illustrating group 50, regions 58, 60, and 62, and one embodiment of a set of branch selectors 70 is illustrated. The branch selectors within set 70 correspond to byte ranges defined within group 50. For the example shown in FIG. 4, nine branch selectors are used for a group of 16 contiguous instruction bytes. Set 70 therefore occupies less storage within a branch prediction storage than set 52 shown in FIG. 3 occupies, allowing the branch prediction storage to be made smaller. Still further, a narrower selection device may be used to select a branch selector in response to a fetch address. The selected branch selector may be provided more rapidly, and may thereby provide for a higher frequency implementation in which predicted fetch addresses are provided each clock cycle.

Generally, the largest byte range defined for a given branch selector may be made equal to the shortest branch instruction (excluding the return instruction as described in more detail below). The majority of the byte ranges are selected to be the largest size. However, to handle certain conditions, the embodiment shown in FIG. 4 employs two byte ranges which are smaller than the maximum size. In particular, the initial byte of the group 50 forms a byte range having a single byte (as explained in more detail below with respect to FIG. 6). Since group 50 is an even number of bytes, the byte range corresponding to the initial byte includes only the initial byte, and the largest byte range is two bytes in this example, another byte range is defined to have a single byte as well. For set 70, the byte within group 50 which is contiguous to the initial byte is selected to be a single byte range. This selection allows for a relatively simple decode of the offset of the fetch address to select a branch selector, as illustrated in FIG. 5.

Since the byte ranges are selected to be no larger than the shortest branch instruction, a branch instruction may begin in one byte range and end in a subsequent byte range. However, at most one branch instruction ends in a particular byte range, even if branch instructions are consecutive within a particular group of contiguous instruction bytes. For the case of a branch instruction which ends within a particular byte range but not at the end of the byte range, the branch selector for that byte range is selected to be the branch selector corresponding to instruction bytes subsequent to the branch instruction. For example, the branch selector for byte range 72 (which includes bytes 3–4, where the initial byte is numbered byte 0) indicates the branch prediction corresponding to predicted branch PB1. The above rule is used because a fetch address within the byte range is not fetching the branch instruction (which begins in the preceding byte range). Therefore, the correct branch prediction is the prediction for the subsequent branch.

On the other hand, if the branch instruction ends at the last byte within the byte range, the branch selector for the byte range is the branch selector corresponding to the branch instruction (e.g. byte range 74). Therefore, if a fetch address specifying predicted branch PB1 (i.e. the offset is within byte range 74), then the branch prediction used for the fetch is the branch prediction corresponding to branch PB1.

Turning now to FIG. 5, a table 76 is shown corresponding to the selection of byte ranges for branch selectors as illustrated in the example of FIG. 4. The row of table 76 labeled "Byte Position" lists the byte positions within group 50 which correspond to each byte range (i.e. the offset portion of the address for each byte which is within each byte range). The row labeled "Branch Selector Position" illustrates the branch selector position within the set 70 of the branch selector corresponding to each byte range. The row labeled "Read Addresses" lists the fetch address offsets (in binary) which are decoded to select the branch selector within the corresponding byte range (in order to form a predicted fetch address for the subsequent clock cycle). An "x" in the read addresses indicates a don't care position. Finally, the row labeled "Encoding Addresses" lists the fetch address offsets (in binary) at which a branch instruction can end and still have the branch selector for that byte range indicate the branch prediction corresponding to that branch instruction. For example, branch selector position 2 can indicate the branch prediction for a branch instruction which ends at either byte position 3 or 4. More particularly, a branch instruction which ends at byte position 2 is not represented by the branch selector in branch selector position 2 (because the branch instruction begins in a different byte range than that associated with branch selector position 2, and is therefore not being fetched if the fetch address offset is within the byte range associated with branch selector position 2).

The "Read Addresses" row of table 76 illustrates that a relatively simple decoding of the fetch address offset can be used to select the appropriate branch selector for that fetch address. The decoding for branch selector positions 0 and 1 include each of the fetch address offset bits, but the decoding for the remaining positions may exclude the least significant bit (since it is a don't care). A rapid decode and branch selector selection may be achieved using the allocation of byte ranges illustrated in FIG. 4.

Figure 6:
FIG. 6 is a first example of branch selectors for a first exemplary set of instructions.

Turning now to FIG. 6, a first example 80 of branch selectors for the byte ranges shown in FIGS. 4 and 5 is shown. Example 80 illustrates the use of the byte range including only byte 0 of a group of contiguous instruction bytes. Example 80 shows an instruction IN0 ending at byte "E" of a first group of contiguous instruction bytes, a predicted branch PB0 extended from byte "F" of the first group to byte 0 of a second group of contiguous instruction bytes which are sequential to the first group, and an instruction IN1 beginning at byte "1" of the second group.

Since branch instruction PB0 does not end until byte 0 of the second group, the second group needs to be fetched from instruction cache 16. Therefore, the branch selector corresponding to bytes "E" and "F" of the first group indicates sequential, thereby causing the second group to be fetched. The sequential fetch address includes an offset portion set to zero (since bytes immediately subsequent to the last bytes of the first group are being fetched). Therefore, the branch selector corresponding to byte "0" of the second group is selected. The branch selector is coded to select the branch prediction corresponding to branch instruction PB0.

If a bytes 0 and 1 of the second group formed a byte range similar to the other byte ranges shown in FIGS. 4 and 5, branch instruction PB0 would not be predictable. To allow for predictions of branches which extend across groups of instruction bytes, the byte ranges are defined to include a byte range consisting of byte "0" in the present embodiment.

Figure 7:
FIG. 7 is a second example of branch selectors for a second exemplary set of instructions.

Turning now to FIG. 7, a second example 82 of branch selectors for the byte ranges shown in FIGS. 4 and 5 is shown. Example 82 illustrates a situation in which a predicted branch instruction PB0 is followed by a return instruction RET. Branch instruction PB0 ends at byte "4", which is within the byte range corresponding to branch selector position 3 (i.e. byte "4" is not the last byte in the byte range). Therefore, the branch selector at branch selector position 3 does not select the branch prediction for PB0, as noted above regarding a branch instruction which ends within a byte range. The RET instruction does end at the last byte of the byte range. Therefore, the branch selector for branch selector position 3 indicates the return instruction (i.e. an encoding of "1" in example 82). In this example, the return selector bit associated with branch prediction 1 is asserted, which indicates branch prediction 1 is associated with a return instruction.

On the other hand, FIG. 8 illustrates an example 84 in which a return instruction is not predicted. Example 84 includes a predicted branch instruction PB0, a return instruction RET, and an instruction IN1. Branch instruction PB0 ends at the last byte of the byte range corresponding to branch selector position 2, and therefore the corresponding branch selector is encoded to select the branch prediction corresponding to branch instruction PB0. The return instruction ends within the byte range corresponding to branch selector position 3, and therefore the corresponding branch selector does not indicate the return instruction. In this manner, if instruction IN0 is indicated by the fetch address, the return instruction will not be erroneously predicted by the branch selector at branch selector position 3. However, if the return instruction is the byte indicated by the fetch address, an incorrect prediction results.

It is noted that the code sequence shown in example 84 may be uncommon, because often times temporary variables are popped from the stack just prior to executing a return instruction. Therefore, a predicted taken branch would not often immediately precede a return instruction.

FIG. 9 illustrates an example 86 of in which a return instruction may be mispredicted. In example 86, a return instruction is followed immediately by a predicted branch instruction PB0. This code sequence may again be infrequent, since the only way to execute branch instruction PB0 is to branch directly to the instruction from elsewhere in the code sequence. Also, the return instruction is only mispredicted in example 86 if branched to directly. If instruction IN0 is fetched and executed, the return instruction is correctly predicted.

Figure 10A:
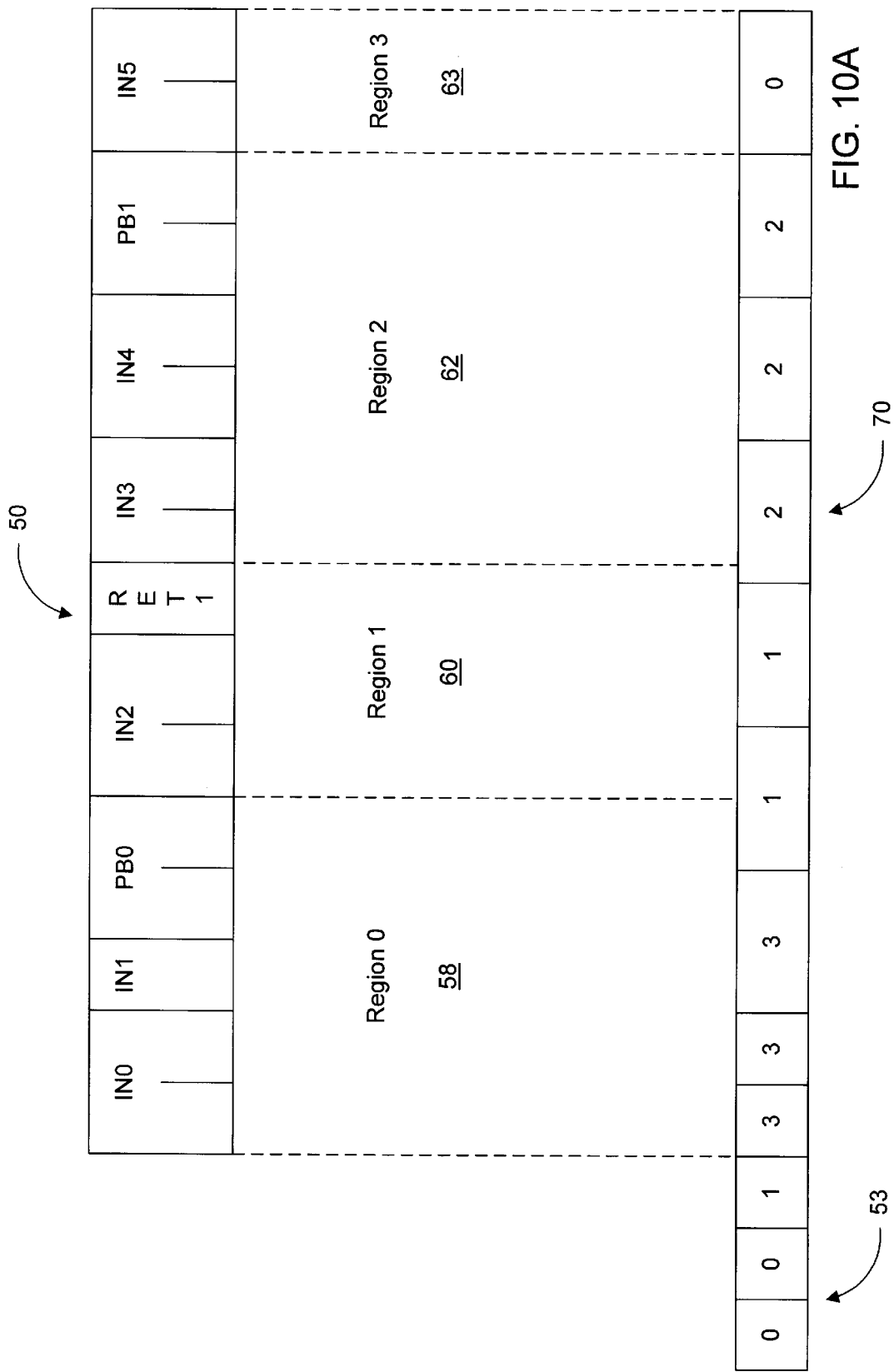
FIGS. 10A–10C are examples of sets of branch selectors and return selectors for exemplary sets of instructions according to one embodiment of the present invention.

Turning now to FIG. 10, a plurality of diagrams of exemplary groups of contiguous instruction bytes 50 and corresponding sets of branch selectors 52 and return selectors 53 are shown. In FIG. 10A, group 50 includes non-branch instructions IN0–IN5, predicted-taken branch instruction PB0 and PB1, and return instruction RET1. It is noted that the length of the instructions is shown for illustrative purposes only. Instructions may occupy more or less instruction bytes and group 50 may include more or less instructions. The end bytes of PB0, PB1 and RET divides group 50 into four regions.

Set 52 is an exemplary set of branch selectors for group 50. The branch selectors within set 70 correspond to byte ranges defined within group 50. The branch selectors within set 70 use the encodings shown in FIG. 13 below. Accordingly, the branch selectors include one sequential branch selector (as indicated by a branch selector value of "0") and three non-sequential branch selectors (as indicated by a branch selector value of "1", "2" or "3"). As discussed above, the return selectors identify the non-sequential branch selectors as return instruction branch predictors or non-return instruction branch predictors.

Set 53 is an exemplary set of return selectors for the non-sequential branch selector. In the illustrated embodiment, one bit is associated with each non-sequential branch selector. In the illustrated embodiment, the left-most return selector bit is associated with branch selectors 3, the middle return selector bit is associated with branch selector 2, and the right-most selector bit is associated with branch selector 1. In other embodiments, return selectors 53 may be associated with only a portion of the non-sequential branch selectors. Each bit of return selectors 53 indicates whether the branch selector associated with the return selector bit identifies a return instruction or a non-return branch instruction. For example, in the illustrated embodiment, branch selector 1 is associated with a return instruction and branch selectors 2 and 3 are associated with non-return branch instructions. Accordingly, the third bit (or right-most bit) of return selector 53 is asserted and the other bits are deasserted. The return selector bits allow the non-sequential branch selectors to accommodate either return instructions or non-return branch instructions. In this manner, multiple combinations of return instructions and non-return branch instructions can be effectively predicted.

In branch prediction unit embodiments without return selectors, certain branch selectors are assigned to return instruction branch predictions and other branch selectors are assigned to non-return instruction branch predictions. For example, in a branch prediction unit with four branch predictions, one branch selector may be a non-sequential branch prediction, one branch prediction may be a return branch prediction and two branch selectors may be non-return branch instruction predictions. In these embodiments, only one return instruction can be effectively predicted in a cache line. Similarly, only two non-return branch instructions can be predicted in a cache line. By adding three return selector bits, the three non-sequential branch predictions can predict more combinations of return instructions and non-return branch instructions. For example, return selectors 53 may be configured such that all three non-sequential branch selectors are return instruction branch predictions. Alternatively, return selectors 53 may be configured such that all three non-sequential branch selectors are non-return branch instruction predictions.

Figure 10B:
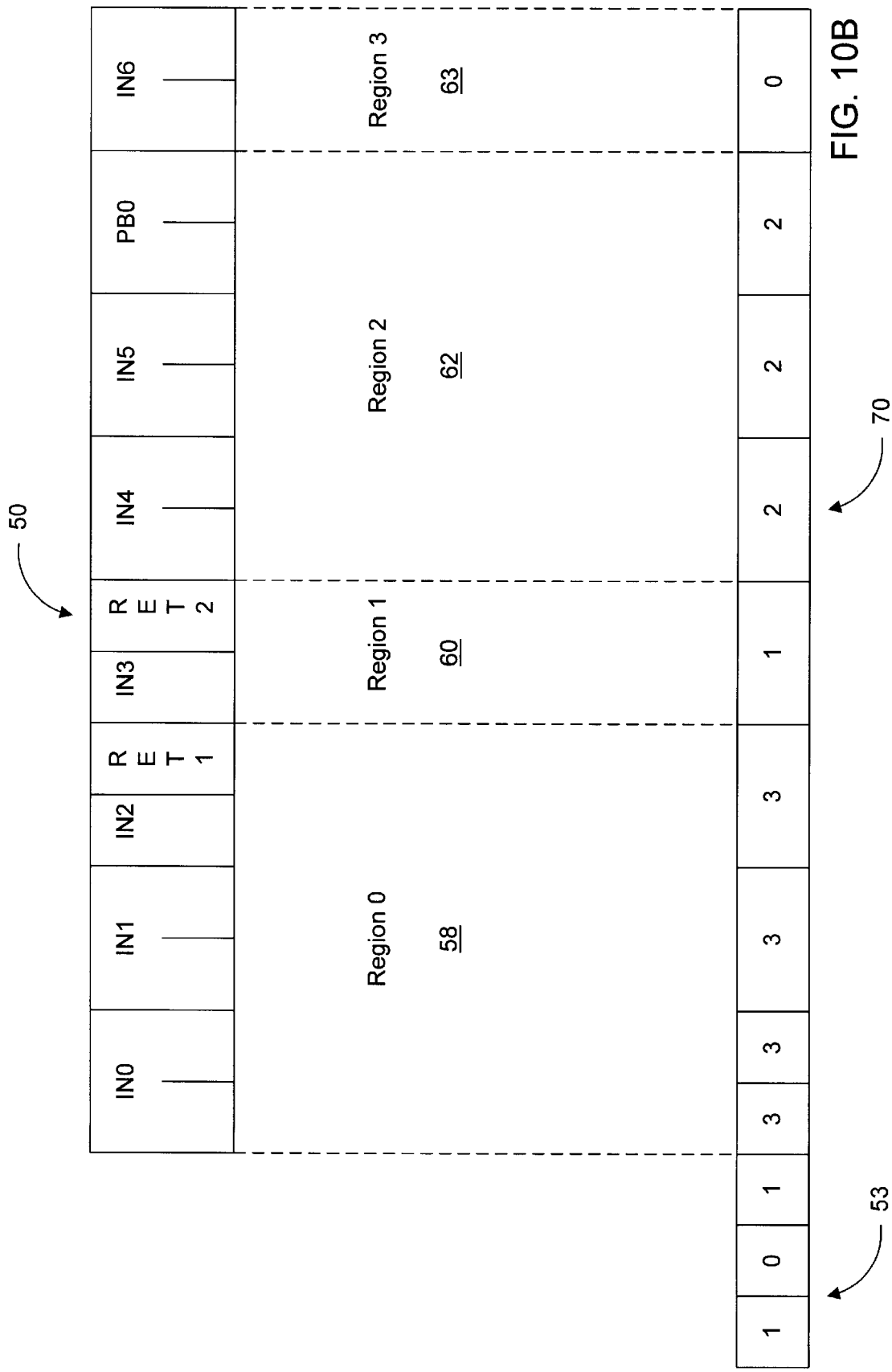

Turning now to FIG. 10B, an example illustrating return selector bits 53 for group 50 which includes two return instructions and one non-return branch instruction is shown. In the illustrated embodiment, the bits of return selector 53 are configured such that branch selectors 1 and 3 are associated with return instructions and branch selector 2 is associated with a non-return branch instruction. In an embodiment without return selector bits in which two non-sequential branch predictions are assigned to non-return branch instructions, the two return instructions could not be predicted. Failing to correctly predict a return instruction may cause the processor to execute and discard the instructions subsequent to the return instruction, which reduces the performance of the processor.

Figure 10C:
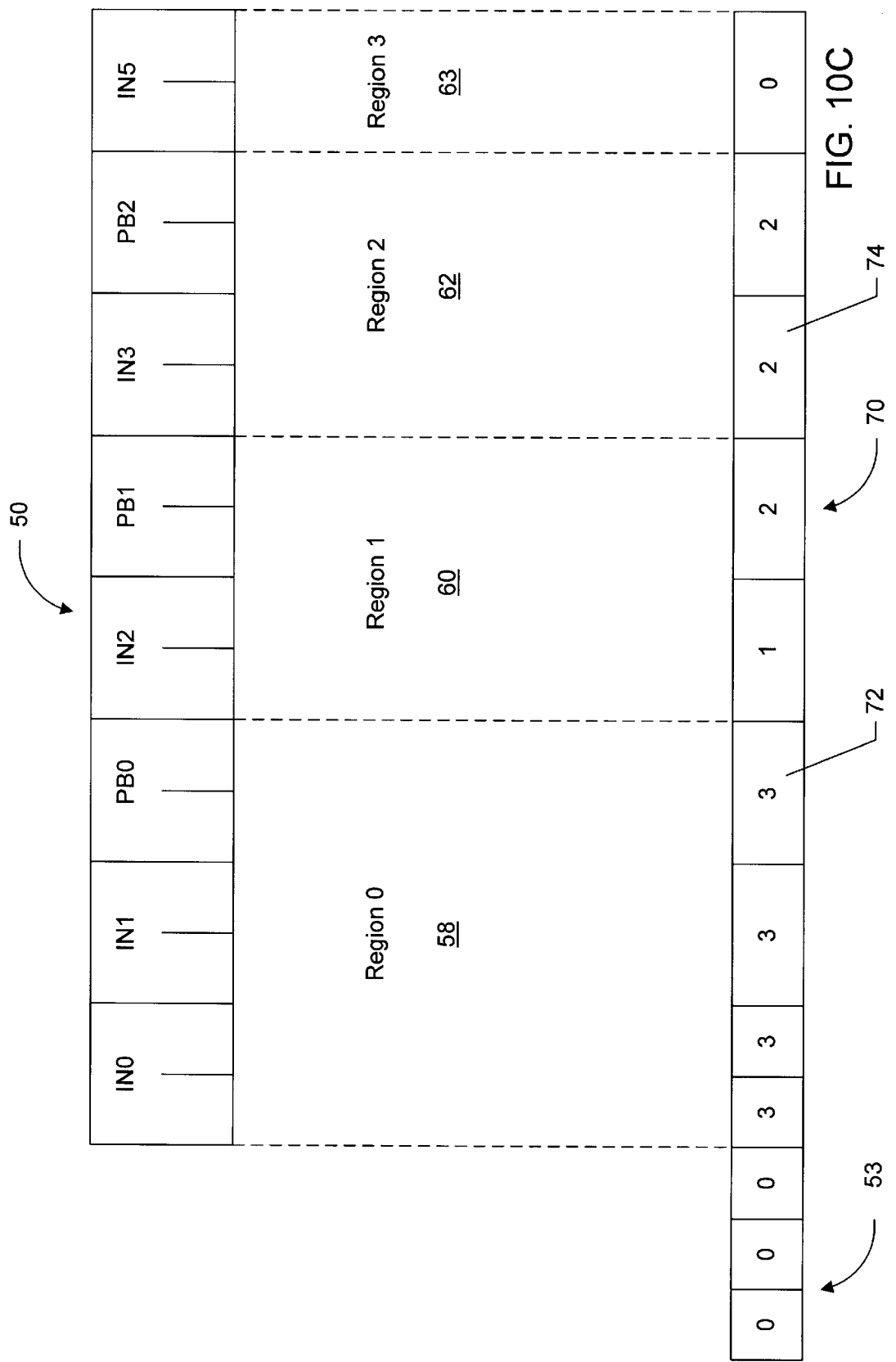

Turning now to FIG. 10C, an embodiment is illustrated in which group 50 includes three non-return branch instructions. In the illustrated embodiment, the bits of return selector 53 are deasserted, which indicates that the non-sequential branch predictions are associated with non-return branch instructions. In the illustrated embodiment, branch selector 3 is associated with PB0, branch selector 2 is associated PB1 and branch selector 1 is associated with PB2.

Figure 11:
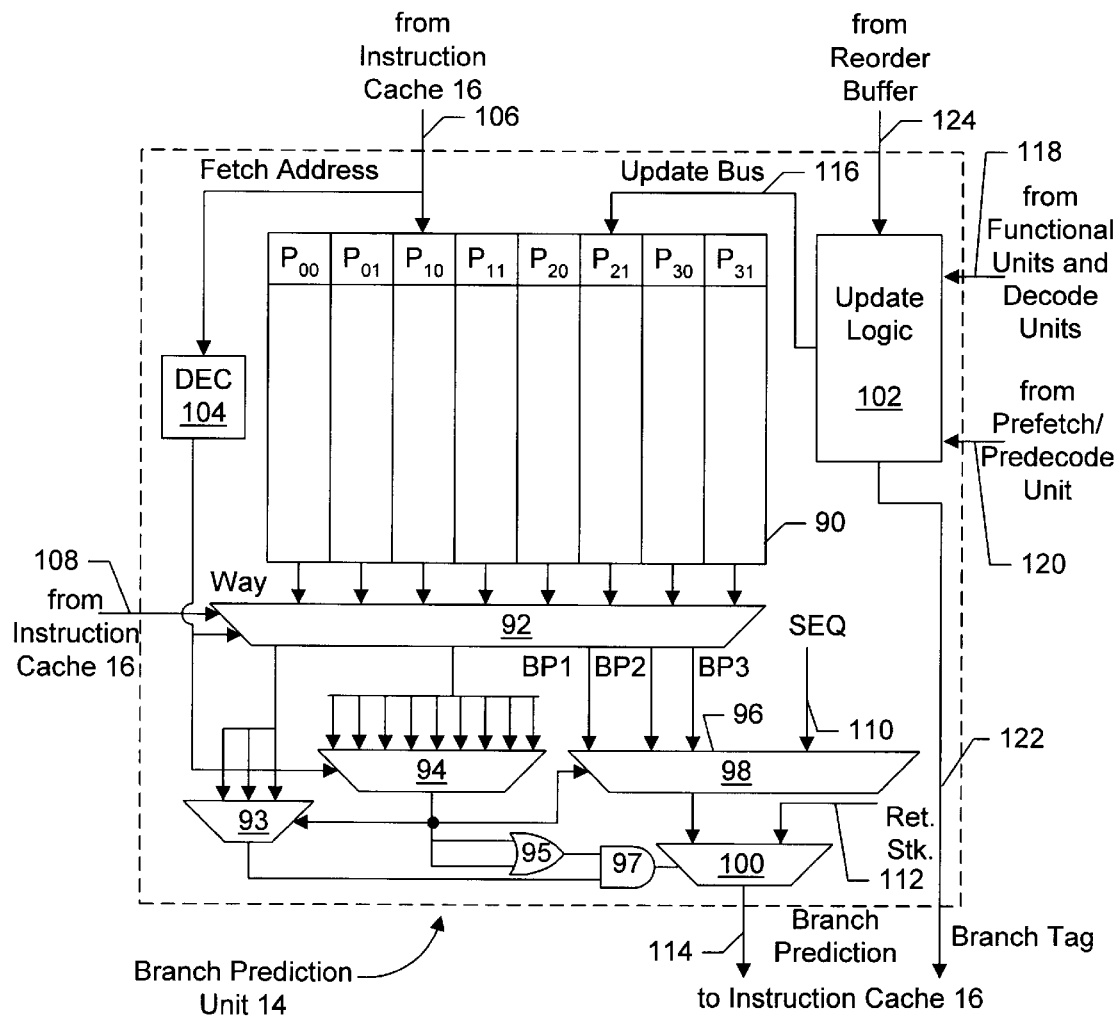
FIG. 11 is a block diagram of a portion of a branch prediction unit according to one embodiment of the present invention.

Turning now to FIG. 11, a portion of one embodiment of branch prediction unit 14 is shown. Other embodiments of branch prediction unit 14 are contemplated. As shown in FIG. 11, branch prediction unit 14 includes a branch prediction storage 90, a way multiplexor 92, a return selector multiplexor 93, a branch selector multiplexor 94, an initial prediction multiplexor 98, a final prediction multiplexor 100, a NOR gate 95, an AND gate 97, an update logic block 102, and a decoder 104. Branch prediction storage 90 and decoder 104 are coupled to a fetch address bus 106 from instruction cache 16. A fetch address concurrently provided to instruction cache 16 is conveyed upon fetch address bus 106. Decoder block 104 provides selection controls to branch selector multiplexor 94. Prediction controls for way multiplexor 92 are provided via a way selection bus 108 from instruction cache 16. Way selection bus 108 provides the way of instruction cache 16 which is storing the cache line corresponding to the fetch address provided on fetch address bus 106. Additionally, a selection control is provided by decoder 104 based upon which portion of the cache line is being fetched.

Way multiplexor 92 is coupled to receive the contents of each storage location within the row of branch prediction storage 90 which is indexed by the fetch address upon fetch address bus 106. Branch selector multiplexor 94 and initial prediction multiplexor 98 are coupled to receive portions of the output of way multiplexor 92 as inputs. Return selector multiplexor is coupled to receive return selector portion of the output of way multiplexor 92 as inputs. The output of branch selector multiplexor 94 provides selection controls for multiplexors 93 and 98. Initial prediction multiplexor 98 selects between a sequential address provided upon a sequential address bus 110 from instruction cache 16 and three branch prediction addresses (BP1, BP2 and BP3). The output of multiplexor 98 and a return address provided upon a return address bus 112 from a return stack are provided to final prediction multiplexor 100, which provides a branch prediction bus 114 to instruction cache 16. An output of multiplexor 94 is provided to OR gate 95. An output of multiplexor 93 and an output of NOR gate 95 are provided to AND gate 97. An output of AND gate provides a selection control for final prediction multiplexor 100.

Instruction cache 16 uses the branch prediction provided upon branch prediction bus 114 as the fetch address for the subsequent clock cycle. Update logic block 102 is coupled to branch prediction storage 90 via an update bus 116 used to update branch prediction information stored therein. Update logic block 102 provides updates in response to a misprediction signaled via a mispredict bus 118 from functional units 24 and decode units 20. Additionally, update logic block 102 provides updates in response to newly predecoded instruction indicated by prefetch/predecode unit 12 upon a predecode bus 120.

In the present embodiment, branch prediction storage 90 is arranged with a number of ways equal to the number of ways in instruction cache 16. For each way, a branch prediction entry is stored for each group of contiguous instruction bytes existing within a cache line. In the embodiment of FIG. 11, two groups of instruction bytes are included in each cache line. Therefore, branch prediction entry $P_{00}$ is the branch prediction entry corresponding to the first group of contiguous instruction bytes in the first way and branch prediction entry $P_{01}$ is the branch prediction entry corresponding to the second group of contiguous instruction bytes in the first way. Similarly, branch prediction entry $P_{10}$ is the branch prediction entry corresponding to the first group of contiguous instruction bytes in the second way and branch prediction entry $P_{11}$ is the branch prediction entry corresponding to the second group of contiguous instruction bytes in the second way, etc. Each branch prediction entry $P_{00}$ to $P_{31}$ in the indexed row is provided as an output of branch prediction storage 90, and hence as an input to way multiplexor 92. The indexed row is similar to indexing into a cache: a number of bits which are not part of the offset portion of the fetch address are used to select one of the rows of branch prediction storage 90. It is noted that branch prediction storage 90 may be configured with fewer rows than instruction cache 16. For example, branch prediction storage 90 may include ¼ the number of rows of instruction cache 16. In such a case, the address bits which are index bits of instruction cache 16 but which are not index bits of branch prediction storage 90 may be stored with the branch prediction information and checked against the corresponding bits of the fetch address to confirm that the branch prediction information is associated with the row of instruction cache 16 which is being accessed.

Way multiplexor 92 selects one of the sets of branch prediction information $P_{00}$–$P_{31}$ based upon the way selection provided from instruction cache 16 and the group of instruction bytes referenced by the fetch address. In the embodiment shown, for example, a 32 byte cache line is divided into two 16 byte groups. Therefore, the fifth least significant bit of the fetch address is used to select which of the two groups contains the fetch address. If the fifth least significant bit is zero, then the first group of contiguous instruction bytes is selected. If the fifth least significant bit is one, then the second group of contiguous instruction bytes is selected. It is noted that the way selection provided upon way selection bus 108 may be a way prediction produced by a branch prediction from the previous clock cycle, according to one embodiment. Alternatively, the way selection may be generated via tag comparisons between the fetch address and the address tags identifying the cache lines stored in each way of the instruction cache. It is noted that an address tag is the portion of the address which is not an offset within the cache line nor an index into the instruction cache.

Figures 12, 13:
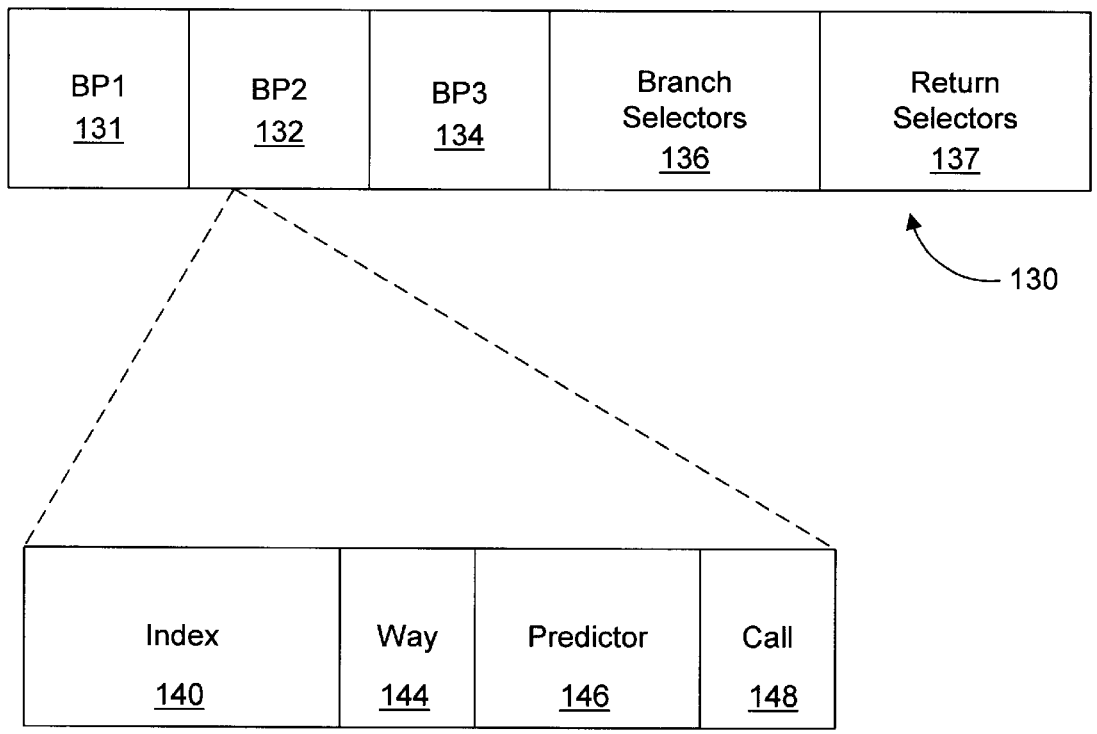
FIG. 12 is a block diagram of one embodiment of a branch prediction storage entry corresponding to a group of contiguous instruction bytes.
FIG. 13 is a table illustrating exemplary branch selector and return selector encodings for one embodiment of the branch prediction unit shown in FIG. 1.

The selected branch prediction entry provided by way multiplexor 92 includes a set of branch selectors corresponding to the group of contiguous instruction bytes, a set of return selectors as well as branch predictions BP1, BP2 and BP3 (see FIG. 12). The branch selectors are provided to branch selector multiplexor 94, which selects one of the branch selectors based upon selection controls provided by decoder 104. Decoder 104 decodes the offset of the fetch address into the group of contiguous instruction bytes to select the corresponding branch selector (for example, according to the "read address" row of table 76, in one embodiment). For example, if a group of contiguous instruction bytes is 16 bytes, then decoder 104 decodes the four least significant bits of the fetch address. In this manner, a branch selector is chosen.

The selected branch selector is used to provide selection controls to initial prediction multiplexor 98 and return selector multiplexor 93. The return selectors are provided to return selector multiplexor 93 which selectors one of the return selector bits based upon the branch selector provided by multiplexor 94. In one embodiment, the encoding of the branch selector can be used directly as the multiplexor select controls. In other embodiments, a logic block may be inserted between branch selector multiplexor 94 and multiplexors 93 and 98. Multiplexor 98 selects a branch prediction from the multiple branch predictions stored in branch prediction storage 90 corresponding to the group of contiguous instruction bytes being fetched and the sequential address of the group of contiguous instruction bytes sequential to the group of contiguous instruction bytes being fetched.

Multiplexor 100 selects between the branch prediction provided by multiplexor 98 and a return address from a return address stack. Multiplexor 100 is controlled by an output of AND gate 97. AND gate 97 causes multiplexor 100 to select the return address if the branch selector provided by multiplexor 94 is non-sequential and the return selector bit associated with the branch selector indicates the branch selector is associated a return instruction. In the illustrated embodiment, the branch selector value for a sequential branch selector is "0", and the return selector bit is asserted if the branch prediction associated with a return selector bit corresponds to a return instruction. Accordingly, the output of NOR gate 95 is asserted is either bit of the branch selector is asserted, and the output of AND gate 97 is asserted if the output of NOR gate 95 is asserted and the return selector bit provided by multiplexor 93 is asserted. In the illustrated embodiment, multiplexor 100 selects the return address when the output of AND gate 97 is asserted.

The return stack structure (not shown) is used to store return addresses corresponding to subroutine call instructions previously fetched by microprocessor 10. In one embodiment, the branch predictions stored by branch prediction storage 90 include an indication that the branch prediction corresponds to a subroutine call instruction. Subroutine call instructions are a subset of branch instructions which save the address of the sequential instruction (the return address) in addition to redirecting the instruction stream to the target address of the subroutine call instruction. For example, the in the x86 microprocessor architecture, the subroutine call instruction (CALL) pushes the return address onto the stack indicated by the ESP register.

A subroutine return instruction is another subset of the branch instructions. The subroutine return instruction uses the return address saved by the most recently executed subroutine call instruction as a target address. Therefore, when a branch prediction includes an indication that the branch prediction corresponds to a subroutine call instruction, the sequential address to the subroutine call instruction is placed at the top of the return stack. When a subroutine return instruction is encountered (as indicted by a particular branch selector encoding), the address nearest the top of the return stack which has not previously been used as a prediction is used as the prediction of the address. The address nearest the top of the return stack which has not previously been used as a prediction is conveyed by the return stack upon return address bus 112 (along with the predicted way of the return address, provided to the return stack similar to its provision upon way selection bus 108. Branch prediction unit 14 informs the return stack when the return address is selected as the prediction. Additional details regarding an exemplary return stack structure may be found in the commonly assigned, co-pending patent application entitled: "Speculative Return Address Prediction Unit for a Superscalar Microprocessor", Ser. No. 08/550,296, filed Oct. 30, 1995 by Mahalingaiah, et al. The disclosure of the referenced patent application is incorporated herein by reference in its entirety.

The sequential address is provided by instruction cache 16. The sequential address identifies the next group of contiguous instruction bytes within main memory to the group of instruction bytes indicated by the fetch address upon fetch address bus 106. It is noted that, according to one embodiment, a way prediction is supplied for the sequential address when the sequential address is selected. The way prediction may be selected to be the same as the way selected for the fetch address. Alternatively, a way prediction for the sequential address may be stored within branch prediction storage 90.

As mentioned above, update logic block 102 is configured to update a branch prediction entry upon detection of a branch misprediction or upon detection of a branch instruction while predecoding the corresponding group of contiguous instruction bytes in prefetch/predecode unit 12. The branch prediction entry corresponding to each branch prediction may be stored in update logic block 102 as the prediction is performed. A branch tag is conveyed along with the instructions being fetched (via a branch tag bus 122), such that if a misprediction is detected or a branch instruction is detected during predecoding, the corresponding branch prediction entry can be identified via the branch tag. In one embodiment, the branch prediction entry as shown in FIG. 12 is stored, as well as the index of the fetch address which caused the branch prediction entry to be fetched and the way in which the branch prediction entry is stored.

When a branch misprediction is detected, the corresponding branch tag is provided upon mispredict bus 118 from either the functional unit 24 which executes the branch instruction or from decode units 20. If decode units 20 provide the branch tag, then the misprediction is of the previously undetected type (e.g. there are more branch instructions in the group than can be predicted using the corresponding branch predictions). Decode units 20 detect mispredictions of unconditional branch instructions (i.e. branch instructions which always select the target address). Functional units 24 may detect a misprediction due to a previously undetected conditional branch instruction or due to an incorrect taken/not-taken prediction. Update logic 102 selects the corresponding branch prediction entry out of the aforementioned storage. In the case of a previously undetected branch instruction, one of the branch predictions within the branch prediction entry is assigned to the previously undetected branch instruction. According to one embodiment, the algorithm for selecting one of the branch predictions to store the branch prediction for the previously undetected branch instruction is as follows: If the branch instruction is a subroutine return instruction, the branch selector for the instruction is selected to be the value indicating the return stack. Otherwise, a branch prediction which is currently predicted not-taken is selected. If each branch prediction is currently predicted-taken, then a branch prediction is randomly selected.

Figure 15:
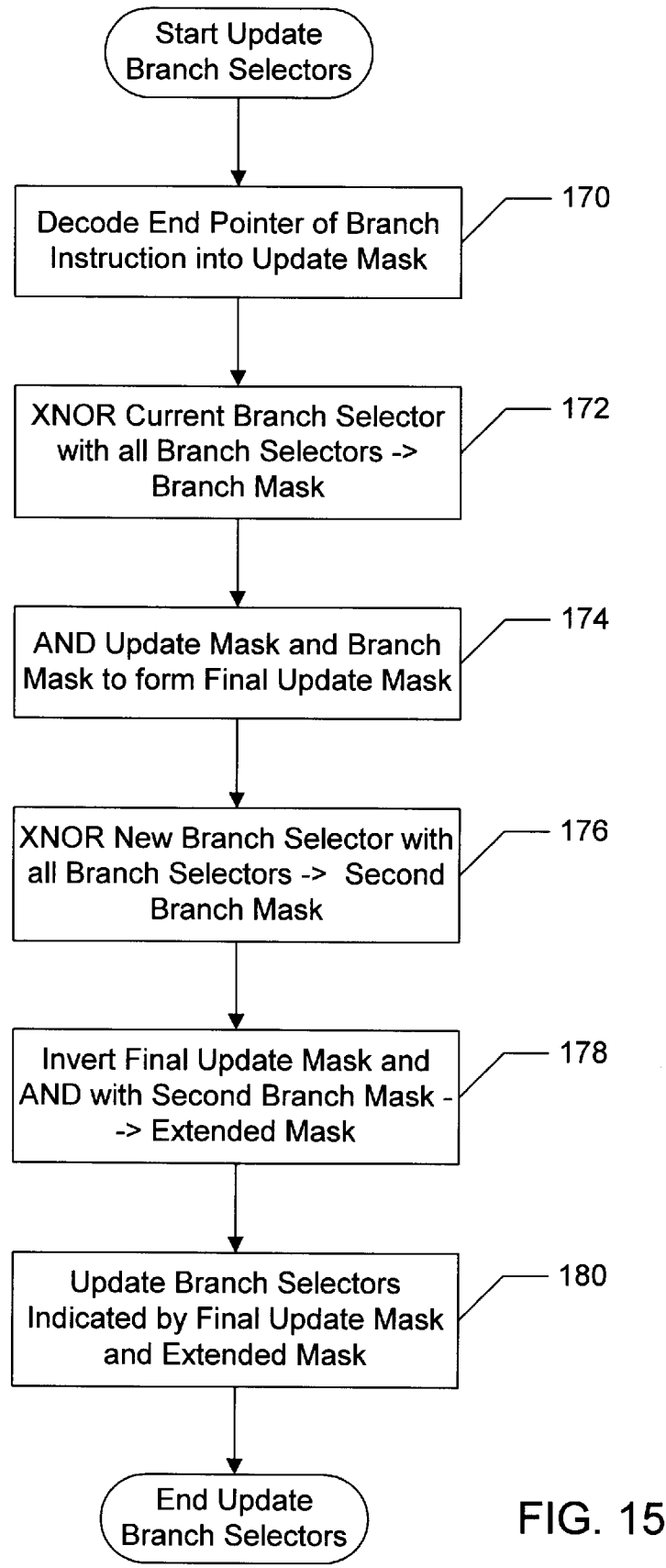
FIG. 15 is a flow chart illustrating one embodiment of branch selector update.

The branch selector for the newly detected branch instruction is set to indicate the selected branch prediction. Additionally, the branch selectors corresponding to byte ranges between the first branch instruction prior to the newly detected branch instruction and the newly detected branch instruction are set to the branch selector corresponding to the new prediction. FIG. 15 below describes one method for updating the branch selectors. For a mispredicted taken prediction which causes the prediction to become predicted not-taken, the branch selectors corresponding to the mispredicted prediction are set to the branch selector corresponding to the byte subsequent to the mispredicted branch instruction. In this manner, a prediction for a subsequent branch instruction will be used if the instructions are fetched again at a later clock cycle.

When prefetch/predecode unit 12 detects a branch instruction while predecoding a group of contiguous instruction bytes, prefetch/predecode unit 12 provides the branch tag for the group of contiguous instruction bytes if the predecoding is performed because invalid predecode information is stored in the instruction cache for the cache line (case (i)). Alternatively, if the predecoding is being performed upon a cache line being fetched from the main memory subsystem, prefetch/predecode unit 12 provides the address of the group of contiguous instruction bytes being predecoded, the offset of the end byte of the branch instruction within the group, and the way of the instruction cache selected to store the group (case (ii)). In case (i), the update is performed similar to the branch misprediction case above. In case (ii), there is not yet a valid branch prediction entry stored in branch prediction storage 90 for the group of instructions. For this case, update logic block 102 initializes the branch selectors prior to the detected branch to the branch selector selected for the detected branch. Furthermore, the branch selectors subsequent to the detected branch are initialized to the sequential value. Alternatively, each of the branch selectors may be initialized to sequential when the corresponding cache line in instruction cache 16 is allocated, and subsequently updated via detection of a branch instructions during predecode in a manner similar to case (i).

Upon generation of an update, update logic block 102 conveys the updated branch prediction entry, along with the fetch address index and corresponding way, upon update bus 116 for storage in branch prediction storage 90. It is noted that, in order to maintain branch prediction storage 90 as a single ported storage, branch prediction storage 90 may employ a branch holding register. The updated prediction information is stored into the branch holding register and updated into the branch prediction storage upon an idle cycle on fetch address bus 106. An exemplary cache holding register structure is described in the commonly assigned, co-pending patent application entitled: "Delayed Update Register for an Array", Ser. No. 08/481,914, filed Jun. 7, 1995, by Tran, et al., incorporated herein by reference in its entirety.

It is noted that a correctly predicted branch instruction may result in an update to the corresponding branch prediction as well. A counter indicative of previous executions of the branch instruction (used to form the taken/not-taken prediction of the branch instruction) may need to be incremented or decremented, for example. Such updates are performed upon retirement of the corresponding branch prediction. Retirement is indicated via a branch tag upon retire tag bus 124 from reorder buffer 32.

It is noted that the structure of FIG. 11 may be further accelerated through the use of a predicted branch selector. The predicted branch selector is stored with each branch prediction entry and is set to the branch selector selected in a previous fetch of the corresponding group of contiguous instruction bytes. The predicted branch selector is used to select the branch prediction, removing branch selector multiplexor 94 from the path of branch prediction generation. Branch selector multiplexor 94 is still employed, however, to verify the selected branch selector is equal to the predicted branch selector. If the selected branch selector and the predicted branch selector are not equal, then the selected branch selector is used to provide the correct branch prediction during the succeeding clock cycle and the fetch of the incorrect branch prediction is canceled.

Turning now to FIG. 12, an exemplary branch prediction entry 130 employed by one embodiment of the branch prediction unit 14 as shown in FIG. 10 is shown. Branch prediction entry 130 includes a set of branch selectors 136, a set of return selectors 137, a first branch prediction (BP1) 131, and a second branch prediction (BP2) 132 and a third branch prediction (BP3) 134. Set of branch selectors 136 includes a branch selector for each byte range of the group of contiguous instruction bytes corresponding to branch prediction entry 130. In one embodiment, the set of return selectors 136 include one bit for each non-sequential branch selector.

Second branch prediction 132 is shown in an exploded view in FIG. 12. The other branch predictions may be configured similarly. Second branch prediction 132 includes an index 140 for the cache line containing instruction bytes corresponding to the target address, and a way selection 144 for the cache line as well. According to one embodiment, index 140 includes the offset portion of the target address, as well as the index. Index 140 is concatenated with the tag of the way indicated by way selection 144 to form the branch target address. Alternatively, the entire branch target address may be stored in index field 140. Way prediction may be provided in addition to the entire branch target address, or way selection may be performed using tag comparisons against the tags in the indexed row of instruction cache 16.

Additionally, a predictor 146 is stored for each branch prediction. Predictor 146 is incremented each time the corresponding branch instruction is executed and is taken, and is decremented each time the corresponding branch instruction is executed and is not-taken. The most significant bit of predictor 146 is used as the taken/not-taken prediction. If the most significant bit is set, the branch instruction is predicted taken. Conversely, the branch instruction is predicted not-taken if the most significant bit is clear. In one embodiment, the prediction counter is a two bit saturating counter. The counter saturates when incremented at binary '11' and saturates when decremented at a binary '01'. In another embodiment, the predictor is a single bit which indicates a strong (a binary one) or a weak (a binary zero) taken prediction. If a strong taken prediction is mispredicted, it becomes a weak taken prediction. If a weak taken prediction is mispredicted, the branch becomes predicted not taken and the branch selector is updated (i.e. the case of a mispredicted branch that becomes not-taken). Finally, a call bit 148 is included in first branch prediction 132. Call bit 148 is indicative, when set, that the corresponding branch instruction is a subroutine call instruction. If call bit 148 is set, the current fetch address and way are stored into the return stack structure mentioned above.

Turning now to FIG. 13, table 138 illustrating exemplary branch and return selector encodings is shown. Table 138 illustrates the type of branch prediction based upon return selector encodings and branch encodings. The branch selector encodings are binary encodings with the most significant bit first. The return selectors encodings are binary encodings with the most significant bit first. An "X" indicates a don't care bit. For example, if the branch selection encoding is "00", the branch prediction is sequential regardless of the state of the return selector bits. If the branch selection encoding is "01", the branch prediction is a return if the least significant return selector bit is asserted. Alternatively, if the least significant bit of the return selector is deasserted, the branch prediction a non-return branch target. In a similar manner, if the branch selector value is "01", the second most significant return selector bit indicates whether the branch prediction is a return or non-return branch target. Likewise, if the branch selector value is "11", the most significant return selector bit indicates whether the branch prediction is a return or non-return branch target.

Figure 14:
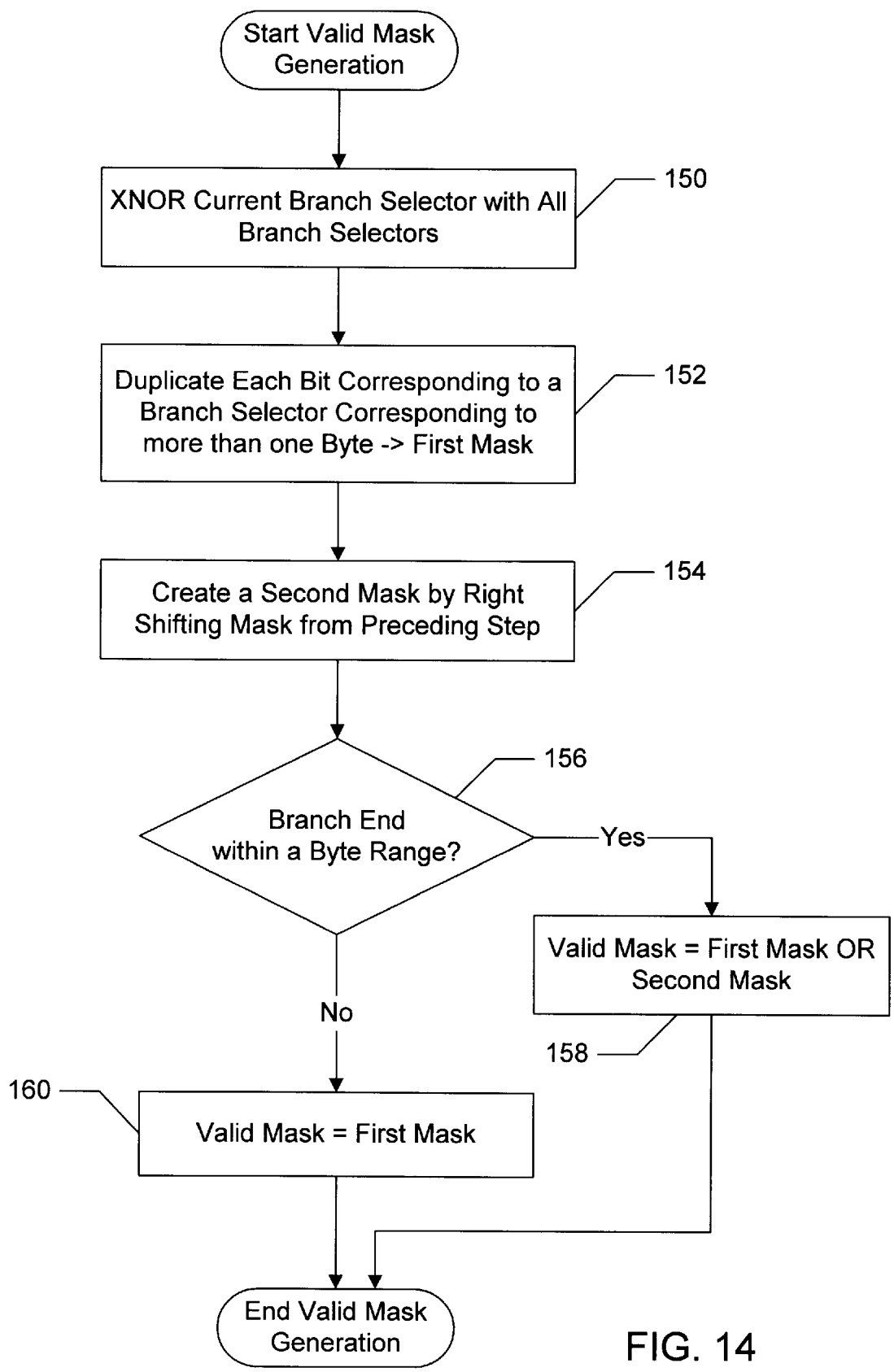
FIG. 14 is a flow chart illustrating mask generation according to one embodiment of the microprocessor shown in FIG. 1.

Turning next to FIG. 14, a flowchart is shown illustrating the generation of a valid mask for a group of contiguous instruction bytes fetched from instruction cache 16 according to the byte ranges defined in FIGS. 4 and 5. The valid mask includes a bit for each instruction byte within the group, indicating whether or not the byte is part of the predicted instruction stream. Valid bits within the mask are set between the byte selected by the offset portion of the fetch address and the branch instruction being predicted by the selected branch prediction. Those bytes comprise the instructions being fetched from the group of contiguous instruction bytes read from instruction cache 16. Bytes prior to the offset of the fetch address are not being fetched, and bytes subsequent to the predicted taken branch instruction are not being fetched either. The end of the branch instruction is approximately located by the last instance of the corresponding branch selector. However, an adjustment may be made to cover the last byte of the branch instruction in cases in which the branch instruction ends within a byte range.

The current branch selector (i.e. the branch selector selected by branch prediction unit 14 by decoding the fetch address) is XNOR'd with the branch selectors corresponding to the group of contiguous instruction bytes (step 150), thereby creating a preliminary mask including one bit per byte range. Each byte range corresponding to a branch selector equal to the current branch selector is represented by a set bit in the preliminary mask, and byte ranges including different branch selectors than the current branch selector are represented by a clear bit within the preliminary mask. A first mask is created from the preliminary mask by duplicating each bit in the preliminary mask which corresponds to a byte range having more than one byte (i.e. two bytes in the present embodiment—step 152). Generally, the bit is copied until the total number of bits representing the byte range is equal to the number of bytes within that byte range. Additionally, a second mask is created by right shifting the first mask (step 154).

If the predicted taken branch instruction ends within a byte range (as opposed to the end of the byte range), then the valid mask is created by ORing the first mask and the second mask (decision block 156 and step 158). In this manner, bytes within the byte range in which the branch instruction ends which are part of the branch instruction are validated. On the other hand, if the branch instruction ends at the end of a byte range then the branch selector for that byte range indicates the branch instruction. In this case, the first mask is correct without modification using the second mask. Therefore, the first mask is selected as the valid mask (step 160).

Turning now to FIG. 15, a flowchart depicting the steps employed to update the branch selectors of a group of contiguous instruction bytes in response to a mispredicted branch instruction is shown. Updating due to a branch instruction discovered during predecoding may be performed similarly. The misprediction may be the result of detecting a branch instruction for which prediction information is not stored in branch prediction storage 90, or may be the result of an incorrect taken/not-taken prediction which causes the corresponding predictor to indicate not-taken.

Upon detection of the misprediction, branch prediction unit 14 uses an "end pointer": the offset of the end byte of the mispredicted branch instruction within the corresponding group of contiguous instruction bytes. Additionally, the branch prediction entry is selected for update using the branch tag received in response to the misprediction. Branch prediction unit 14 decodes the end pointer into an update mask (step 170). The update mask comprises a bit for each byte range within the group of contiguous instruction bytes. Bits corresponding to byte ranges prior to the byte range including the branch instruction's end byte are set (and the bit corresponding to the byte range including the branch instruction's end byte is set if the end byte is the last byte within the byte range), and the remaining bits are clear. Therefore, the update mask identifies each byte range prior to and including the branch instruction.

Branch prediction unit 14 identifies the current branch selector. For mispredicted taken/not-taken predictions, the current branch selector is the branch selector corresponding to the mispredicted branch instruction. For misprediction due to an undetected branch, the current branch selector is the branch selector corresponding to the byte range including the end byte of the undetected branch instruction. The current branch selector is XNOR'd with each of the branch selectors to create a branch mask (step 172). The branch mask includes bits which are set for each byte range having a branch selector which matches the current branch selector and bits which are clear for each byte range having a branch selector which does not match the current branch selector.

The update mask created in step 170 and the branch mask created in step 172 are subsequently ANDed, producing a final update mask (step 174). The final update mask includes bits which are set for each byte range of the group of contiguous instruction bytes which is to be updated to the new branch selector. For a mispredicted taken branch, the new branch selector is the branch selector of the byte range subsequent to the mispredicted taken branch instruction. For an undetected branch, the new branch selector is the branch selector indicating the branch prediction storage assigned to the previously undetected branch by update logic block 102.

An extended mask is also generated (steps 176 and 178). The extended mask indicates which branch selectors are to be erased because the branch prediction corresponding to the branch selector has been reallocated to the newly discovered branch instruction or because the branch prediction now indicates not taken. The extended mask is generated by first creating a second branch mask similar to the branch mask, except using the new branch selector instead of the current branch selector (i.e. the mask is created by XNORing the branch selectors corresponding to the group of contiguous instruction bytes with the new branch selector (step 176)). The resulting mask is then ANDed with the inversion of the final update mask to create the extended mask (step 178). Branch selectors corresponding to bits in the extended mask which are set are updated to indicate the branch selector of the byte range immediately subsequent to the last byte range for which a bit in the extended mask is set. In this manner, the branch prediction formerly indicated by the branch selector is erased and replaced with the following branch selector. During a step 180, the branch selectors are updated in response to the final update mask and the extended mask.

Figure 16:
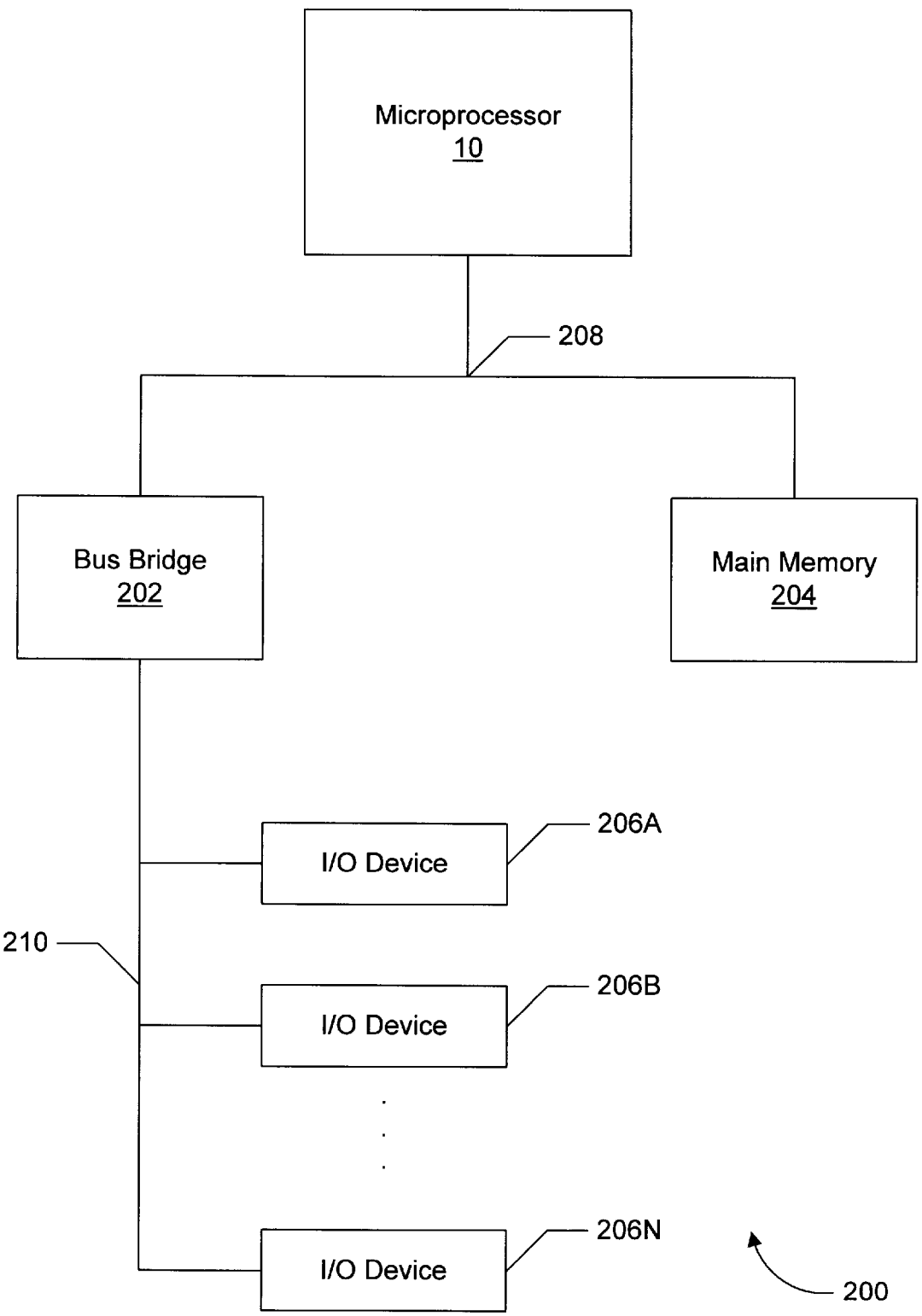
FIG. 16 is a block diagram of one embodiment of a computer system according to the microprocessor shown in FIG. 1.

Turning now to FIG. 16, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208.Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 17 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |

TABLE 1-continued x86 Fast Path, Double Dispatch, and MROM Instructions

| X86 Instruction | Instruction Category |
|---|---|
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |

TABLE 1-continued x86 Fast Path, Double Dispatch, and MROM Instructions

| X86 Instruction | Instruction Category |
| --- | --- |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note:
Instructions including an SIB byte are also considered double dispatch instructions.

It is noted that other aspects of branch prediction mechanisms employing branch selectors may be found in the following co-pending, commonly assigned patent applications: "Branch Prediction Mechanism Employing Branch Selectors to Select a Branch Prediction", Ser. No. 08/752,691, filed Nov. 19, 1996 by Tran; and "Branch Selectors Associated with Byte Ranges within an Instruction Cache for Rapidly Identifying Branch Predictions", Ser. No. 08/957,596, filed Oct. 24, 1997 by Tran. The disclosures of these applications are herein incorporated by reference in their entirety.

Numerous variations and modifications will become apparent to those skilled in the art once the above disclosure is fully appreciated. It is intended that the following claims be interpreted to embrace all such variations and modifications.

What is claimed:

1. A branch prediction apparatus, comprising:
 a branch prediction storage coupled to receive a fetch address corresponding to a group of contiguous instruction bytes being fetched from an instruction cache, wherein said branch prediction storage is configured to store a plurality of branch selectors and a first return selector, wherein a first one of said plurality of branch selectors corresponds to a first instruction within said group of contiguous instruction bytes, wherein said first return selector corresponds to said first one of said plurality of branch selectors, wherein said first one of said plurality of branch selectors corresponds to a first category of branch prediction in response to detecting a first condition of said first return selector, wherein said first one of said plurality of branch selectors corresponds to a second category of branch prediction in response to detecting a second condition of said first return selector, and wherein said first one of said plurality of branch selectors and said first return selector identify a first branch prediction to be selected in response to said first instruction being fetched; and
 a selection mechanism coupled to said branch prediction storage, wherein said selection mechanism is configured to receive said plurality of branch selectors and said first return selector, wherein said selection mechanism is configured to select said first one of said plurality of branch selectors in response to a plurality of least significant bits of said fetch address and to select said first branch prediction in response to said first one of said plurality of branch selectors and said first return selector.

2. The branch prediction apparatus as recited in claim 1 wherein said group of contiguous instruction bytes comprises a portion of a cache line of said instruction cache.

3. The branch prediction apparatus as recited in claim 2 wherein said portion of said cache line comprises one half of said cache line.

4. The branch prediction apparatus as recited in claim 1 wherein said first branch prediction comprises one of a plurality of branch predictions stored in said branch prediction storage, and wherein said plurality of branch predictions correspond to said group of contiguous instruction bytes.

5. The branch prediction apparatus as recited in claim 4 wherein said first one of said plurality of branch selectors identifies a sequential address as said first branch prediction.

6. The branch prediction apparatus as recited in claim 4 wherein said first one of said plurality of branch selectors identifies a non-sequential address as said first branch prediction.

7. The branch prediction apparatus as recited in claim 1 wherein said first category of branch prediction comprises a target address of a non-return branch instruction, and wherein said second category of branch prediction comprises a return stack address.

8. The branch prediction apparatus as recited in claim 7 wherein said first condition of said first return selector corresponds to a first value of said first return selector, and wherein said second condition of said first return selector corresponds to a second value of said first return selector.

9. The branch prediction apparatus as recited in claim 1 wherein a second one of said plurality of branch selectors corresponds to a second instruction within said group of contiguous instruction bytes, wherein a second return selector corresponds to said second one of said plurality of branch selectors, wherein said second one of said plurality of branch selectors corresponds to said first category of branch prediction in response to detecting a first condition of said second return selector, wherein said second one of said plurality of branch selectors corresponds to said second category of branch prediction in response to detecting a second condition of said second return selector, and wherein said second one of said plurality of branch selectors and said second return selector identify a second branch prediction to be selected in response to said second instruction being fetched.

10. The branch prediction apparatus as recited in claim 1 wherein said group of contiguous instruction bytes includes a first plurality of instructions, wherein said first plurality of instructions includes said first instruction and a first branch instruction, wherein said group of contiguous instruction bytes includes a second plurality of instructions, wherein said second plurality of instructions includes a second branch instruction, wherein said first one of said plurality of branch selectors and said first return selector correspond to said first plurality of instructions, and wherein a second one of said plurality of branch selectors and a second return selector correspond to said second plurality of instructions.

11. The branch prediction apparatus as recited in claim 10, wherein said group of contiguous instruction bytes includes a third plurality of instructions, wherein a third one of said plurality of branch selectors corresponds to said third plurality of instructions, and wherein said third one of said plurality of branch selectors identifies a sequential address.

12. A method for selecting a branch prediction corresponding to a group of contiguous instruction bytes that include a plurality of instructions, comprising:

storing a plurality of branch selectors in a branch prediction storage, wherein one of said plurality of branch selectors corresponds to a first one of said plurality of instructions;

storing a return selector in said branch prediction storage, wherein said return selector corresponds to said one of said plurality of said branch selectors and wherein said one of said plurality of branch selectors corresponds to a first category of branch prediction in response to detecting a first condition of said return selector, and wherein said one of said plurality of branch selectors corresponds to a second category of branch prediction in response to detecting a second condition of said return selector, and wherein said one of said plurality of branch selectors and said return selector identify said branch prediction to be selected in response to said plurality of instructions being fetched;

fetching said group of contiguous instruction bytes and fetching said plurality of branch selectors and said return selector using a fetch address identifying said group of contiguous instruction bytes;

selecting said one of said plurality of branch selectors in response to said fetch address; and selecting said branch prediction in response to said one of said plurality of said branch selectors and said return selector.

13. The method as recited in claim 12 wherein said branch prediction comprises one of a plurality of branch predictions stored in said branch prediction storage, and wherein said plurality of branch predictions correspond to said group of contiguous instruction bytes.

14. The method as recited in claim 13 further comprising updating said plurality of branch predictions in response to a branch misprediction.

15. The method as recited in claim 14 wherein said updating comprises assigning one of said plurality of branch predictions stored in said branch prediction storage to a previously undetected branch instruction within said group of contiguous instruction bytes.

16. The method as recited in claim 15 further comprising updating said plurality of branch selectors to reflect said previously undetected branch instruction.

17. The method as recited in claim 12 wherein said first category of branch prediction comprises a target address of a non-return branch instruction, and wherein said second category of branch prediction comprises a return stack address.

18. The method as recited in claim 17 wherein said first condition of said return selector corresponds to a first value of said return selector, and wherein said second condition of said return selector corresponds to a second value of said return selector.

19. The method as recited in claim 12 wherein said selecting said one of said plurality of branch selectors comprises decoding a plurality of least significant bits of said fetch address.

20. The method as recited in claim 19 wherein said plurality of least significant bits of said fetch address comprise an offset into said group of contiguous instruction bytes whereby each of said group of contiguous instruction bytes is identifiable by using a different value of said offset.

21. A microprocessor comprising:

an instruction processing pipeline;

an instruction cache configured to store a plurality of contiguous instruction bytes and to provide a group of said plurality of contiguous instruction bytes upon receipt of a current fetch address to said instruction processing pipeline; and a branch prediction unit coupled to said instruction cache, wherein said branch prediction unit includes a branch prediction storage coupled to receive said current fetch address, wherein said branch prediction storage is configured to store a plurality of branch selectors and a return selector, wherein one of said plurality of branch selectors corresponds to a first instruction within said plurality of contiguous instruction bytes, wherein said return selector corresponds to said one of said plurality of branch selectors, wherein said one of said plurality of branch selectors corresponds to a first category of branch prediction in response to detecting a first condition of said return selector, wherein said one of said plurality of branch selectors corresponds to a second category of branch prediction in response to detecting a second condition of said return selector, and wherein said one of said plurality of branch selectors and said return selector identify a branch prediction to be selected in response to said first instruction being fetched, wherein said branch prediction identifies a subsequent fetch address.

22. The microprocessor as recited in claim 21 wherein said one of said plurality of branch selectors is selected by decoding a plurality of least significant bits of said current fetch address.

* * * * *